US012598644B2

(12) United States Patent
Xia et al.

(10) Patent No.: US 12,598,644 B2
(45) Date of Patent: Apr. 7, 2026

(54) MULTIPLE STATION ACCESS IN A RESERVED TARGET-WAIT-TIME SERVICE PERIOD

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, Burlingame, CA (US); Li-Hsiang Sun, San Jose, CA (US); Liangxiao Xin, Santa Clara, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 524 days.

(21) Appl. No.: 18/056,709

(22) Filed: Nov. 17, 2022

(65) Prior Publication Data

US 2023/0199647 A1     Jun. 22, 2023

Related U.S. Application Data

(60) Provisional application No. 63/265,561, filed on Dec. 16, 2021.

(51) Int. Cl.
| | |
|---|---|
| *H04W 74/0816* | (2024.01) |
| *H04W 52/02* | (2009.01) |
| *H04W 84/12* | (2009.01) |

(52) U.S. Cl.
CPC ... *H04W 74/0816* (2013.01); *H04W 52/0216* (2013.01); *H04W 84/12* (2013.01)

(58) Field of Classification Search
CPC .................................................. H04W 72/0816
See application file for complete search history.

(56) References Cited

U.S. PATENT DOCUMENTS

| | | |
|---|---|---|
| 2017/0302417 A1 | 10/2017 | Chun |
| 2018/0167369 A1 | 6/2018 | Shapira |

(Continued)

FOREIGN PATENT DOCUMENTS

| | | |
|---|---|---|
| WO | 2018075098 A1 | 4/2018 |

OTHER PUBLICATIONS

Selinis, Ioannis, "Performance study of 802.11n WLAN and MAC enhancements in ns-3", Master thesis, University of Piraeus 2014, pp. 1-71.

(Continued)

*Primary Examiner* — Jason E Mattis
(74) *Attorney, Agent, or Firm* — O'BANION & RITCHEY LLP; John P. O'Banion

(57) ABSTRACT

New reverse direction (RD) protocols for EHT devices during reserved target wait time (R-TWT) service periods (SPs). In this protocol the R-TWT scheduling AP does not have to trigger the RD initiator when it performs as the RD responder, and can trigger TB PPDU(s). In addition, the RD initiator is enabled to inform the RD initiator to inform its non-AP peer STA about the R-TWT information in the transmitted RD PPDU. The RD initiator is enabled to send a new MU RD PPDU to both the R-TWT scheduling AP and the non-AP peer STA, which allows the AP to quickly takeover scheduling if the non-AP peer STA is a non-RTWT member and has limited access the in current ongoing R-TWT SP.

27 Claims, 23 Drawing Sheets

Control Info Subfield w/added R-TWT Fields

~320

| AC Constraint | RDG/More PPDU | PSRT PPDU | R-TWT AP Grant | R-TWT Mem | R-TWT Peer Address Check | Reserved |
|---|---|---|---|---|---|---|

(56) References Cited

U.S. PATENT DOCUMENTS

| | | | |
|---|---|---|---|
| 2021/0297184 A1 | 9/2021 | Huang | |
| 2023/0047705 A1* | 2/2023 | Xin | H04W 74/0808 |
| 2023/0139168 A1* | 5/2023 | Xin | H04W 74/0866 |
| | | | 370/311 |
| 2023/0247668 A1* | 8/2023 | Akhmetov | H04W 74/0816 |
| | | | 370/329 |
| 2024/0334487 A1* | 10/2024 | Yang | H04W 74/006 |
| 2024/0340950 A1* | 10/2024 | Hwang | H04W 74/00 |
| 2024/0373350 A1* | 11/2024 | Baek | H04W 52/0229 |

OTHER PUBLICATIONS 802 11 Working Group of the LAN/MAN Standards Committee of the IEEE Computer Society: IEEE Draft; Draft P802.11AX_D5.I, IEEE-SA, Piscataway, NJ USA , vol. 802.llax drafts, No. D5.1 Nov. 6, 2019 (Nov. 6, 2019), pp. 1-770, XP068155342, Retrieved from the Internet: URL:http://www.ieee802.org/11/private/Draft_Standards/llax/Draft%20P802.llax_D5.1.pd f [retrieved on Nov. 6, 2019] paragraphs [10.29.2], [10.29.3], [10.29.4], [10.47.1].

* cited by examiner

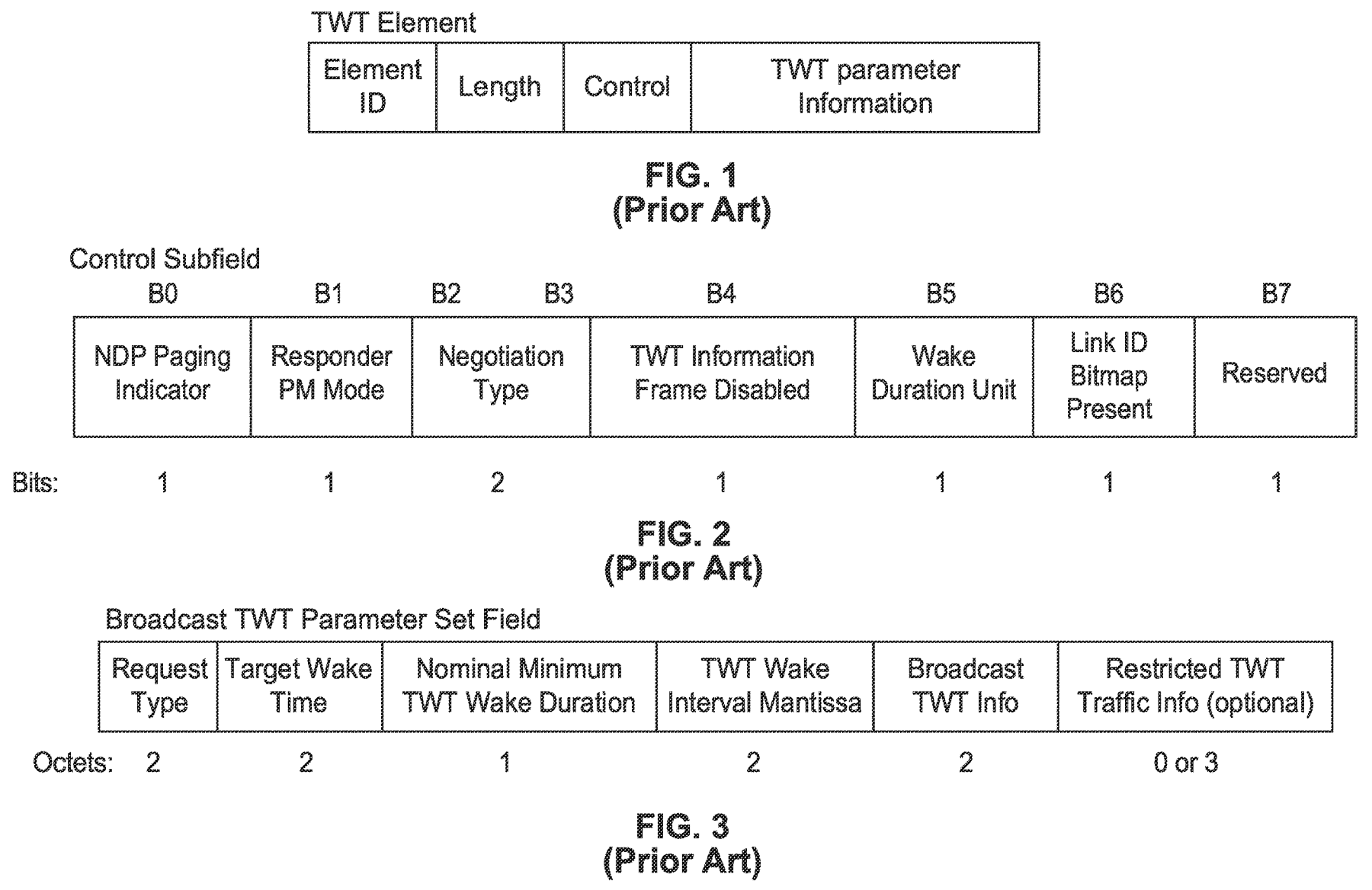

TWT Element

| Element ID | Length | Control | TWT parameter Information |
|---|---|---|---|

**FIG. 1
(Prior Art)**

Control Subfield

| B0 | B1 | B2  B3 | B4 | B5 | B6 | B7 |
|---|---|---|---|---|---|---|
| NDP Paging Indicator | Responder PM Mode | Negotiation Type | TWT Information Frame Disabled | Wake Duration Unit | Link ID Bitmap Present | Reserved |
| 1 | 1 | 2 | 1 | 1 | 1 | 1 |

Bits:

**FIG. 2
(Prior Art)**

Broadcast TWT Parameter Set Field

| Request Type | Target Wake Time | Nominal Minimum TWT Wake Duration | TWT Wake Interval Mantissa | Broadcast TWT Info | Restricted TWT Traffic Info (optional) |
|---|---|---|---|---|---|
| 2 | 2 | 1 | 2 | 2 | 0 or 3 |

Octets:

**FIG. 3
(Prior Art)**

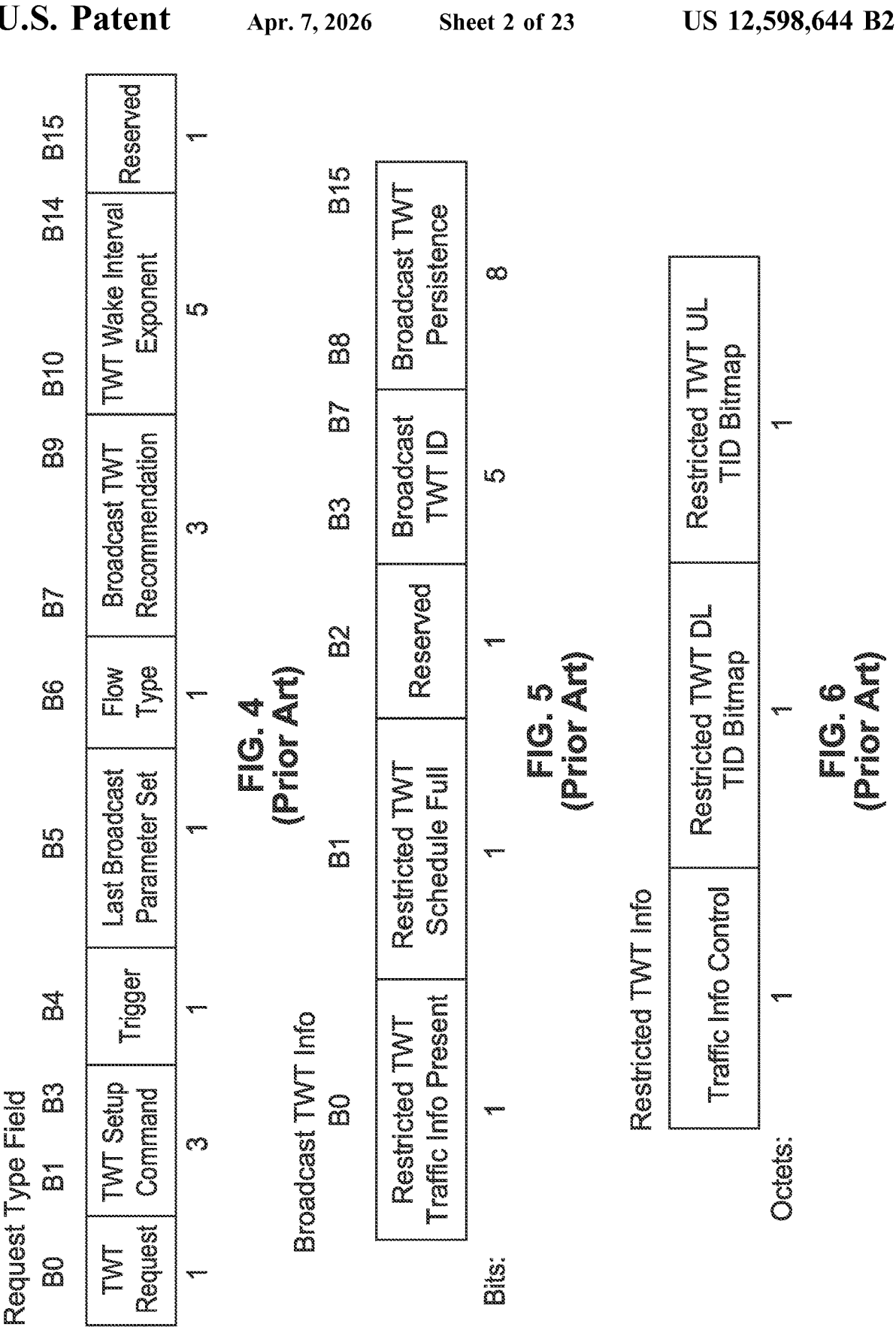

Request Type Field

| B0 | B1 | B2 | B3 | B4 | B5 | B6 | B7 | B8 | B9 | B10 | B11 | B12 | B13 | B14 | B15 |
|----|----|----|----|----|----|----|----|----|----|-----|-----|-----|-----|-----|-----|
| TWT Request | TWT Setup Command | | | Trigger | Last Broadcast Parameter Set | Flow Type | Broadcast TWT Recommendation | | | TWT Wake Interval Exponent | | | | | Reserved |
| 1 | 3 | | | 1 | 1 | 1 | 3 | | | 5 | | | | | 1 |

Bits:

FIG. 4
(Prior Art)

Broadcast TWT Info

| B0 | B1 | B2 | B3 | B4 | B5 | B6 | B7 | B8 | B9 | B10 | B11 | B12 | B13 | B14 | B15 |
|----|----|----|----|----|----|----|----|----|----|-----|-----|-----|-----|-----|-----|
| Restricted TWT Traffic Info Present | Restricted TWT Schedule Full | Reserved | | | | | Broadcast TWT ID | | | | | Broadcast TWT Persistence | | | |
| 1 | 1 | 1 | | | | | 5 | | | | | 8 | | | |

Bits:

FIG. 5
(Prior Art)

Restricted TWT Info

| Traffic Info Control | Restricted TWT DL TID Bitmap | Restricted TWT UL TID Bitmap |
|----------------------|------------------------------|------------------------------|
| 1 | 1 | 1 |

Octets:

FIG. 6
(Prior Art)

Traffic Info Control

| B0 | B1 | B2    B7 |
|---|---|---|
| DL TID Bitmap Valid | UL TID Bitmap Valid | Reserved |

Bits:

| 1 | 1 | 6 |

TWT Info

| B0    B2 | B3 | B4 | B5    B6 | B7 | B8    Bn |
|---|---|---|---|---|---|
| TWT Flow Identifier | Response Requested | Next TWT Request | Next TWT Subfield Size | All TWT | Next TWT |

Bits:

| 3 | 1 | 1 | 2 | 1 | 0, 32, 48, or 64 |

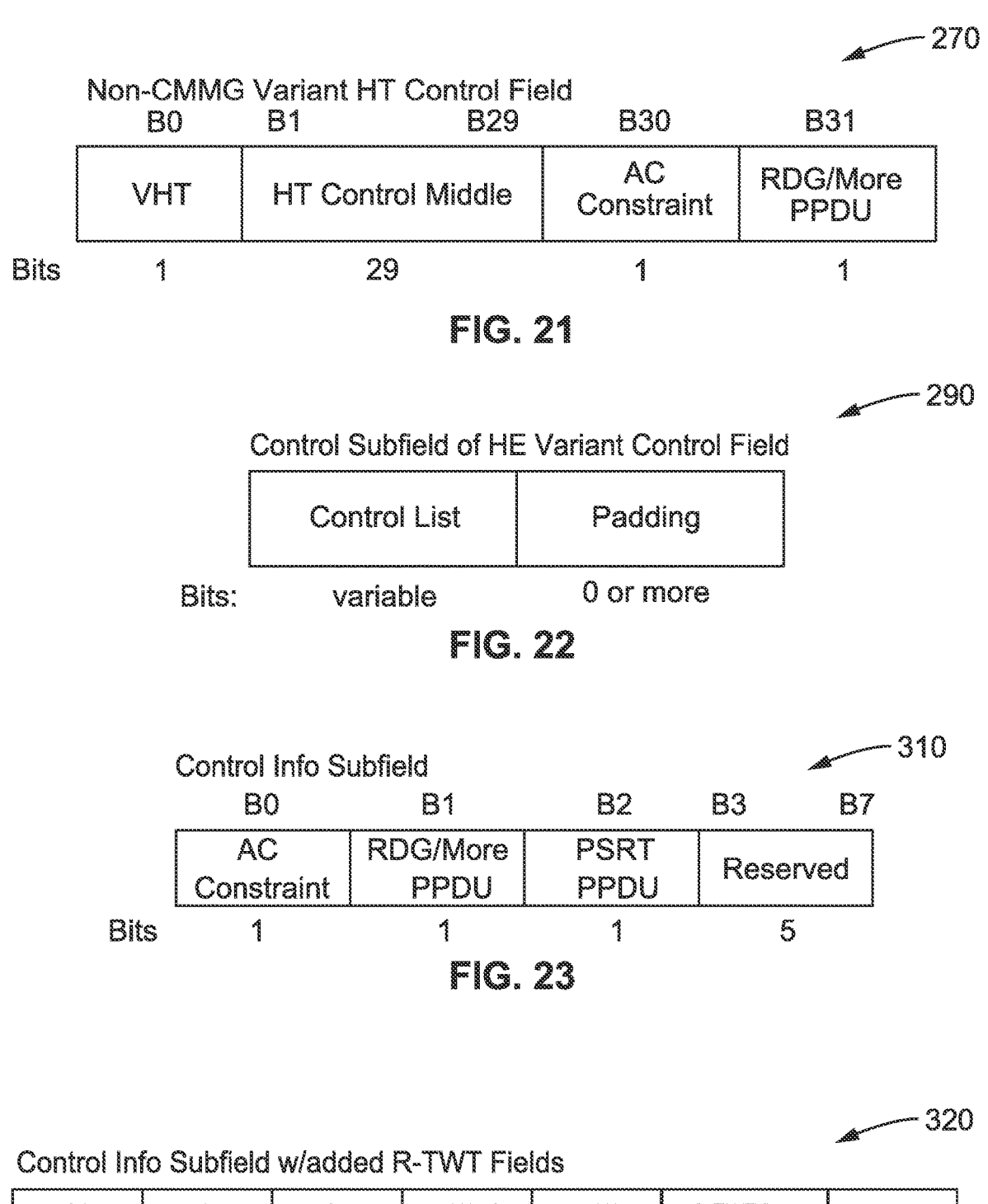

270

Non-CMMG Variant HT Control Field

| B0 | B1          B29 | B30 | B31 |
|----|-----------------|-----|-----|
| VHT | HT Control Middle | AC Constraint | RDG/More PPDU |
| Bits    1 | 29 | 1 | 1 |

Control Subfield of HE Variant Control Field

| Control List | Padding |
|--------------|---------|
| Bits:    variable | 0 or more |

Control Info Subfield

| B0 | B1 | B2 | B3          B7 |
|----|----|----|----------------|
| AC Constraint | RDG/More PPDU | PSRT PPDU | Reserved |
| Bits    1 | 1 | 1 | 5 |

Control Info Subfield w/added R-TWT Fields

| AC Constraint | RDG/More PPDU | PSRT PPDU | R-TWT AP Grant | R-TWT Mem | R-TWT Peer Address Check | Reserved |
|---------------|---------------|-----------|----------------|-----------|--------------------------|----------|

FIG. 24

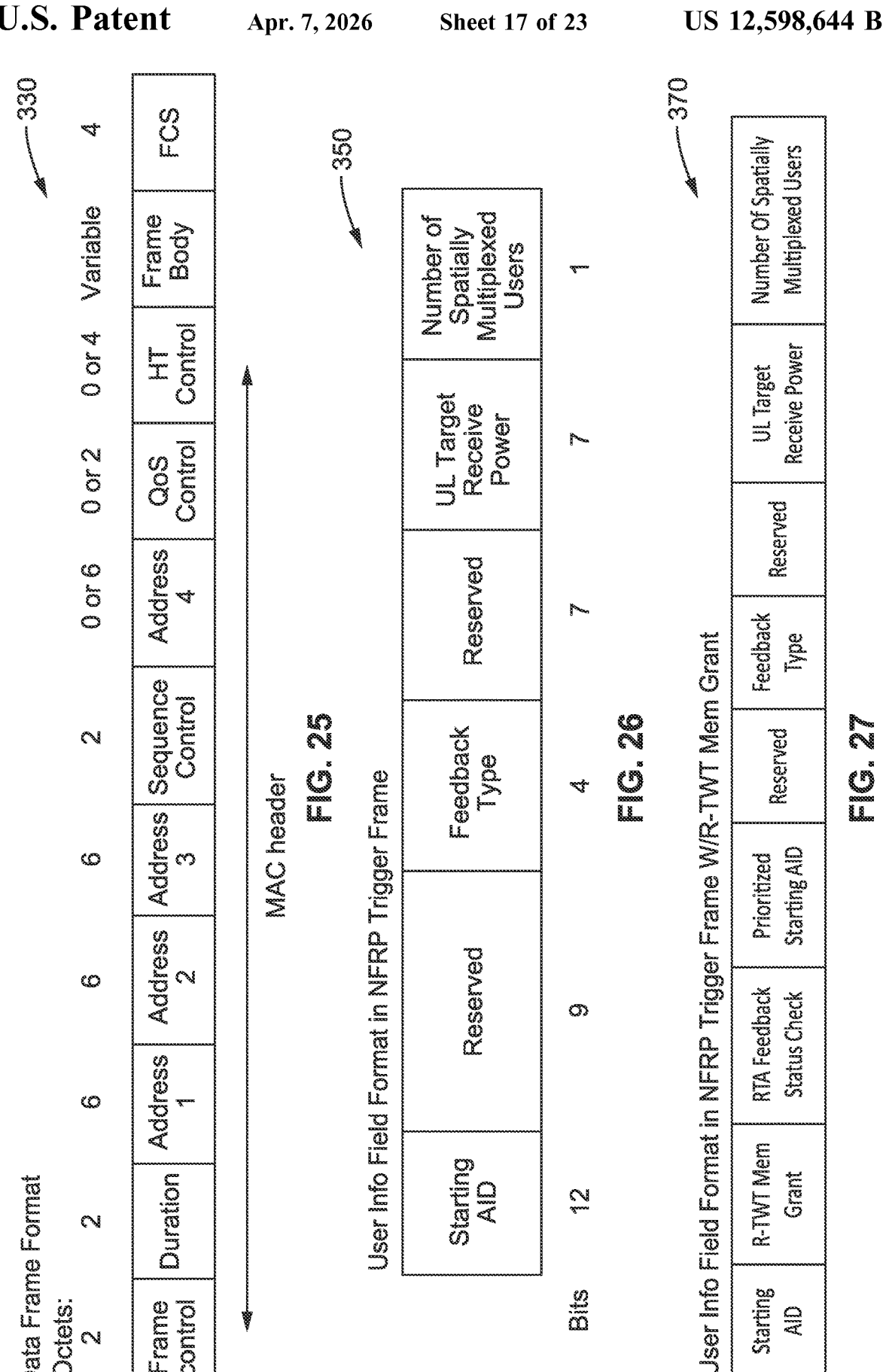

Data Frame Format

| Octets: | 2 | 2 | 6 | 6 | 6 | 2 | 0 or 6 | 0 or 2 | 0 or 4 | Variable | 4 |
|---|---|---|---|---|---|---|---|---|---|---|---|
| | Frame control | Duration | Address 1 | Address 2 | Address 3 | Sequence Control | Address 4 | QoS Control | HT Control | Frame Body | FCS |

330

MAC header

FIG. 25

User Info Field Format in NFRP Trigger Frame

350

| Starting AID | Reserved | Feedback Type | Reserved | UL Target Receive Power | Number of Spatially Multiplexed Users |
|---|---|---|---|---|---|
| Bits | 12 | 9 | 4 | 7 | 7 | 1 |

FIG. 26

User Info Field Format in NFRP Trigger Frame W/R-TWT Mem Grant

370

| Starting AID | R-TWT Mem Grant | RTA Feedback Status Check | Prioritized Starting AID | Reserved | Feedback Type | Reserved | UL Target Receive Power | Number Of Spatially Multiplexed Users |
|---|---|---|---|---|---|---|---|---|

MULTIPLE STATION ACCESS IN A RESERVED TARGET-WAIT-TIME SERVICE PERIOD

CROSS-REFERENCE TO RELATED APPLICATIONS

This application claims priority to, and the benefit of, U.S. provisional patent application Ser. No. 63/265,561 filed on Dec. 16, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

BACKGROUND

1. Technical Field

The technology of this disclosure pertains generally to wireless network communications under CSMA/CA, and more particularly to increasing real-time packet traffic when using R-TWT SPs.

2. Background Discussion

Current wireless technologies using Carrier Sense Multiple Access/Collision Avoidance (CSMA/CA) focus on high throughput network performance. However, an increasing number of applications, such as Real-Time Applications (RTA), require low latency communications. The data generated from the RTA is called RTA traffic and is packetized as RTA frames; while the data generated from a non-time sensitive application is called non-RTA traffic and is packetized as non-RTA frames. Then, the transmitter STA transmits packets carrying frames to the receiver STA over the channel.

The RTA frame requires low latency communication due to its high timeliness delivery requirements. The RTA frame is generally only valid if it is delivered within a specific period of time, whereby it is advantageous to handle the RTA with increased priority.

One intended solution under CSMA/CA is to schedule a service period (SP) of a Restricted Target Wake Time (R-TWT), as defined in 802.11be, for the RTA frame exchange. However, multiple stations may contend for channel access, and each of these may have different access priorities and limitations.

Accordingly, a need exists for improved processing of R-TWT SPs, as accessed by multiple stations. The present disclosure overcomes that issue and provides additional benefits for traffic handling in R-TWTs.

BRIEF SUMMARY

A communications protocol for performing wireless communication in a network, between stations (STAs) and Access Points (APs) using a Carrier Sense Multiple Access/Collision Avoidance (CSMA/CA) mechanism in which Enhanced Distributed Channel Access (EDCA) is utilized for random channel access on all the links.

During a Restricted Target Wait Time (R-TWT) Service Period (SP), a non-AP STA that obtains the Reverse Direction (RD) Transmit Opportunity (TXOP) is performing as a RD initiator, which can transmit a Reverse Direction Grant (RDG) in a Physical Layer Protocol Data Unit (PPDU) containing Medium Access Control (MAC) Physical Data Units (MPDUs) addressed to the associated AP which has been granted complete scheduling capability. A subfield referred to as R-TWT AP Grant, is created in the high throughput (HT) control field for extra-high throughput (EHT) devices, and this subfield is utilized to signal granting of complete scheduling capability to the AP when the AP performs as the RD responder during the R-TWT SP. In addition, the RD initiator indicates R-TWT membership information in the current R-TWT SP to its peer node, which is not the AP.

Additional aspects are described in the details for enhancing RD capability in R-TWT SPs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 1 is a data field diagram of a TWT element.

FIG. 2 is a data field diagram of a Control subfield of the TWT element of FIG. 1.

FIG. 3 is a data field diagram of a Broadcast TWT parameter set.

FIG. 4 is a data field diagram of a Request Type field in the Broadcast TWT parameter set field.

FIG. 5 is a data field diagram of a Broadcast TWT Information subfield in TWT parameter set field.

FIG. 6 is a data field diagram of a Restricted TWT traffic Information field.

FIG. 21 is a data field diagram of a non-CMMG Variant HT Control field format according to at least one embodiment of the present disclosure.

FIG. 22 is a data field diagram of an A-Control subfield as defined in HE variant of the HTC field according to at least one embodiment of the present disclosure.

FIG. 23 is a data field diagram of an HE STA having the RDG/More PPDU subfield and the AC Constraint subfield present in the CAS Control field according to at least one embodiment of the present disclosure.

FIG. 24 is a data field diagram of a Control Information subfield format in a CAS Control subfield with R-TWT AP Grant, R-TWT Info, and R-TWT Peer Address Check subfield according to at least one embodiment of the present disclosure.

FIG. 25 is a data field diagram of a Data frame format according to at least one embodiment of the present disclosure.

FIG. 26 is a data field diagram of a User Information field format in the NFRP trigger frame according to at least one embodiment of the present disclosure.

FIG. 27 is a data field diagram of a User Info field format in the NFRP Trigger frame with R-TWT Member Grant according to at least one embodiment of the present disclosure.

FIG. 30 is a communications diagram of another RD exchange sequence in R-TWT SP for P2P according to at least one embodiment of the present disclosure.

DETAILED DESCRIPTION

1. Introduction to R-TWT Operation

Figures 7, 8:
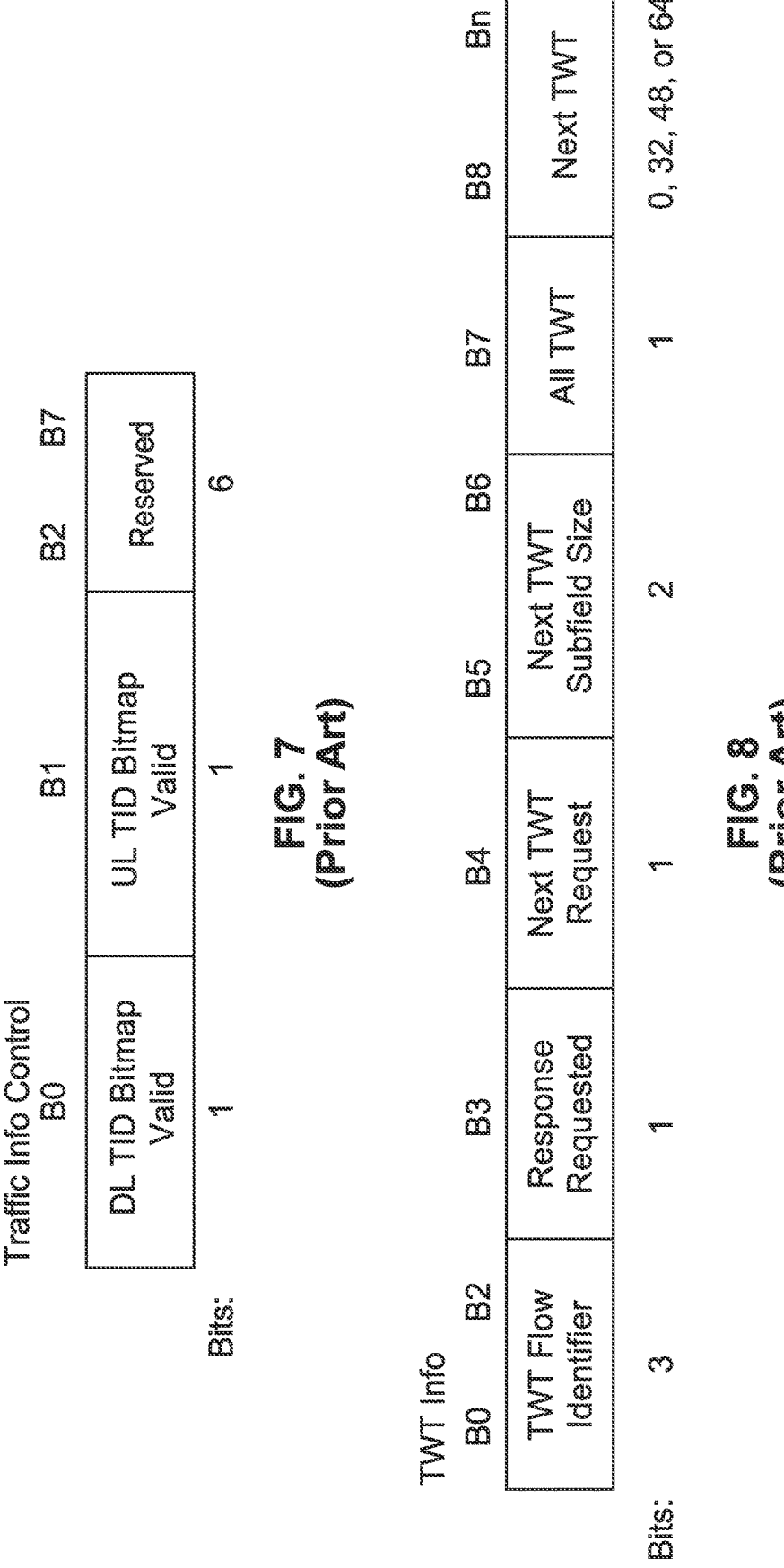
FIG. 7 is a data field diagram of a Traffic Info Control field of the Restricted TWT Traffic information field.
FIG. 8 is a data field diagram of the frame format of the TWT Information field.

A non-Access Point (non-AP) Extra High Throughput (EHT) STA establishes membership for one or more Reserved Target Wait Time (R-TWT) schedules with its associated EHT AP through association (or reassociation) TWT setup frame exchange.

The R-TWT SP is scheduled for completing the transmission to, or from, a group of non-AP STAs which are the R-TWT members of this SP. A non-AP EHT STA Transmit Opportunity (TXOP) holder that agrees to the R-TWT schedule, but that is not a member of a R-TWT SP, should transmit within the R-TWT SP, in which it has the membership.

The non-AP EHT STA that does not have membership in a R-TWT SP should still be able to access the R-TWT SP spontaneously, but it may not have the same priority as that given to R-TWT SP member STAs, especially when the transmission is initiated or triggered by the R-TWT scheduling AP.

A burst of urgent RTA traffic from an application may be generated at any time, and must be sent out as soon as possible. However, burst RTA traffic may suffer delay under R-TWT scheduling if that non-AP EHT STA does not have membership in the current R-TWT SP.

1.1. Elements in IEEE 802.11

1.1.1. TWT Element

FIG. 1 depicts the format of a TWT element defined in IEEE 802.11be, showing an Element Identification (ID) field, Length field, Control field, and TWT Parameter Information.

FIG. 2 depicts the Control field of the TWT element of FIG. 1. The subfields of the control field are as follows. A Null Data Packet (NDP) Paging Indicator is set to a value of 1 to indicate NDP paging is to be performed; otherwise the NDP Paging field is set to 0. The Responder PM Mode subfield indicates the power management mode. The Negotiation Type subfield indicates whether the information included in the TWT element is for negotiating a Broadcast TWT (B-TWT), or an Individual TWT (I-TWT), or a Wake Target Beacon Transmission Time (TBTT) interval. It will be noted that the Most Significant Bit (MSB) of the Negotiation Type subfield is the B-TWT. The TWT Information Frame Disabled subfield is set to 1 to indicate that the reception of the TWT Information frames is disabled by the STA; otherwise, it is set to 0. The Wake Duration Unit subfield indicates the units of the Nominal Minimum TWT Wake Duration field. The Wake Duration Unit Subfield is set to 0 if the unit is 265 μs and is set to 1 if the unit is a TU. The Link ID Bitmap field is present if the Link ID Bitmap Present field is equal to 1; otherwise, the Link ID Bitmap field is not present.

FIG. 3 depicts the Broadcast TWT parameter Set field format. One or more broadcast TWT parameter sets are contained in the TWT element if the Broadcast field of the Negotiation Type subfield has a value of 2 or 3. The Request Type subfield of the Broadcast TWT parameter Set field is shown in FIG. 4. The Target Wake Time (TWT) field contains an unsigned integer corresponding to a TSF time at which the STA requests to wake. It should be noted that if transmitted by a TWT requesting STA, or a TWT scheduled STA, and the TWT Setup Command subfield contains the value corresponding to the command "Request TWT", then the Target Wake Time field contains the value 0.

The Nominal Minimum TWT Wake Duration field indicates the minimum amount of time, in units indicated by the Wake Duration Unit subfield, that the TWT requesting STA or TWT scheduled STA is expected to be awake in order to complete the frame exchanges for the period of TWT wake interval. The TWT Wake Interval Mantissa subfield is set to a binary value of the mantissa of the TWT wake interval value in microseconds (μs). The Broadcast TWT Info subfield is shown in FIG. 5. The Restricted TWT Traffic Info field is presented when the Restricted TWT Traffic Info Present subfield of the Request Type field is set to a value of 1; and its format is defined in FIG. 6.

FIG. 4 depicts the Request type field in the Broadcast TWT parameter Set field. A STA that transmits a TWT element with the TWT Request subfield set equal to a value of 1 is a TWT requesting STA or TWT scheduled STA. Otherwise, it is a TWT responding STA, or TWT scheduling AP.

The TWT Setup Command subfield values indicate the type of TWT. For example, TWT Setup Command field values are as follows: 0="Request TWT"; 1="Suggest TWT"; 2="Demand TWT", and 3="TWT Grouping"; 4="Accept TWT"; 5="Alternate TWT"; 6="Dictate TWT" and 7="Reject TWT".

The meaning of "Request TWT" is that the requesting STA does not provide a set of TWT parameters for a TWT agreement, and thus it leaves the choice of parameters to the responding STA. "Suggest TWT" indicates that the requesting STA offers a set of preferred TWT parameters for a TWT agreement, yet may accept alternative TWT parameters that the responding STA indicates, and "Demand TWT" indicates that the requesting STA will currently accept only the indicated TWT parameters for a TWT agreement.

When transmitted by a responding STA a value of "Accept TWT" indicates that the responding STA has initiated a TWT agreement with the given parameters. A value of "Alternate TWT" indicates a counteroffer of the TWT parameters, although alternative TWT parameters might be accepted as well, without the creation of a TWT agreement. A value of "Dictate TWT" indicates that no TWT agreement is created, but one is likely to be accepted only if the requesting STA transmits a new TWT setup request with the indicated TWT parameters, and a value of "Reject TWT" transmitted by a responding STA as part of a negotiation for a new TWT agreement is used to indicate that the negotiation has ended and failed to create a new TWT agreement.

The Trigger field indicates whether the TWT SP indicated by the TWT element includes a triggering frame. The Trigger field is set to a value of 1 to indicate that at least one triggering frame is transmitted during the TWT SP; otherwise, the Trigger field is set to 0.

The Last Broadcast Parameter Set subfield is set to a value of 0 to indicate that another broadcast TWT Parameter set follows this set. The Last Broadcast Parameter Set subfield is set to a value of 1 to indicate that this is the last broadcast TWT Parameter set in the broadcast TWT element.

The Flow Type subfield indicates the type of interaction between the TWT requesting STA or TWT scheduled STA and the TWT responding STA or TWT scheduling AP at a TWT. Setting the Flow Type subfield to a value of 0 indicates an announced TWT in which the TWT requesting STA or TWT scheduled STA will send a PS-Poll or an APSD trigger frame to signal its awake state to the TWT responding STA or TWT scheduling AP before a frame that is not a trigger frame is sent from the TWT responding STA or TWT scheduling AP to the TWT requesting STA or TWT scheduled STA. Setting the Flow Type subfield to a value of 1 indicates an unannounced TWT in which the TWT responding STA or TWT scheduling AP will send a frame to the TWT requesting STA or TWT scheduled STA at the TWT without waiting to receive a PS-Poll or an APSD trigger frame from the TWT requesting STA or TWT scheduled STA.

A TWT SP that is setup under an announced TWT agreement is an announced TWT SP. A TWT SP that is setup under an unannounced TWT agreement is an unannounced TWT SP.

The Broadcast TWT Recommendation subfield contains a value that indicates recommendations on the types of frames that are transmitted by TWT scheduled STAs and the scheduling AP during the broadcast TWT SP, with values as follows. A value of 0 indicates that there are no constraints on the frames transmitted during a broadcast TWT SP. A value of 1 indicates that the Trigger frame will be transmitted by the TWT scheduling AP during the broadcast TWT SP does not contain RUs for random access and Orthogonal Frequency Division Multiple Access (OFDMA)-based random access (UORA). A value of 2 indicates that the number of Trigger frames transmitted by the TWT scheduling AP during the broadcast TWT SP contains at least one Resource Unit (RU) for random access and Uplink OFDMA Random Access (UORA). A value of 3 indicates no constraints on the frames transmitted during a broadcast TWT SP except that the AP transmits a Traffic Indication Map (TIM) frame, or a Fast Initial Link Setup (FILS) Discovery Frame including a TIM element at the beginning of each TWT SP. A value of 4 indicates that the corresponding broadcast TWT service period is a restricted TWT SP. Values of 5 through 7 are reserved.

The TWT Wake Interval Exponent subfield is set to the value of the exponent of the TWT wake interval as a binary value representing microseconds.

FIG. 5 depicts the Broadcast TWT Info subfield in TWT parameter set field, having the following subfields. A Restricted TWT Traffic Info Present subfield, when included in the Restricted TWT Parameter Set field, is set to a value of 1 to indicate that the Restricted TWT Traffic Info is present; and set to 0 otherwise.

Within a TWT element that includes a TWT setup command value of "Request TWT", "Suggest TWT" or "Demand TWT", the Broadcast TWT ID, if present, indicates a specific Broadcast TWT in which the transmitting STA is requesting to participate. Within a TWT element that includes a TWT setup command value of "Accept TWT", "Alternate TWT", "Dictate TWT" or "Reject TWT", the Broadcast TWT ID, if present, indicates a specific Broadcast TWT for which the transmitting STA is providing a TWT parameter. Within a TWT element that includes a TWT setup command value of TWT Grouping, the Broadcast subfield is 0 and the Broadcast TWT ID, is not present. The value 0 in the Broadcast TWT ID subfield indicates the broadcast TWT whose membership corresponds to all STAs that are members of the BSS corresponding to the BSSID of the Management frame carrying the TWT element.

It should be noted that the Broadcast TWT ID subfield in a R-TWT Parameter Set field is always set to a nonzero value. The Broadcast TWT Persistence subfield indicates the number of TBTTs during which the Broadcast TWT SPs corresponding to this broadcast TWT Parameter set are present.

FIG. 6 depicts the Restricted TWT Traffic Info field, having the following subfields. The Traffic Information Control subfield is described in FIG. 7. The Restricted TWT DL Traffic Identifier (TID) Bitmap and Restricted TWT UL TID Bitmap subfields specify which TID(s) are identified by the TWT scheduling AP or the TWT scheduled STA as latency sensitive traffic streams in the downlink and uplink direction, respectively. If this value is set to a 1 at bit position k in the bitmap, then this indicates that TID k is classified as a latency sensitive traffic stream. If the value at bit position k in the bitmap is set to a 0, then this indicates that TID k is not classified as a latency sensitive traffic stream.

FIG. 7 depicts a Traffic Info Control field of the Restricted TWT Traffic Info field, having the following subfields. The DL TID Bitmap valid subfield indicates if the Restricted TWT DL TID Bitmap field has valid information. When the value is set to 0, this indicates that the DL traffic of all TIDs is identified as latency sensitive traffic, and the Restricted TWT DL Bitmap field is reserved.

The UL TID Bitmap valid subfield indicates if the Restricted TWT UL TID Bitmap field has valid information. When the value is set to 0, it indicates that UL traffic of all TIDs is identified as latency sensitive traffic, and the Restricted TWT UL Bitmap field is reserved.

1.1.2. TWT Information Field

FIG. 8 depicts the frame format of the TWT Information field, having the following subfields. The TWT Flow Identifier subfield contains the TWT flow identifier for which TWT information is requested, or is being provided.

The TWT Flow Identifier subfield is reserved if the All TWT subfield is 1. The Response Requested subfield indicates whether the transmitter of the frame containing the TWT Information field is requesting a TWT Information frame to be transmitted in response to this frame. The Response Requested subfield is set to a value of 0 to request the recipient is not to transmit a TWT Information frame in response to the frame. Otherwise, it is to request the recipient to transmit a TWT Information frame in response to the frame.

The Next TWT Request subfield is set to 1 to indicate that the TWT Information frame is a request for the delivery of a TWT Information frame containing a non-zero length Next TWT field; otherwise, the value is set to 0.

The Next TWT Subfield Size subfield describes the size of the Next TWT subfield. For example, a value of 0 indicates the size of the Next TWT subfield is 0 bits; a value of 1 indicates the size is 32 bits; a value of 2 indicates the size is 48 bits, and a value of 3 indicates the size is 64 bits.

The All TWT subfield is set to 1 by an HE STA to indicate that the TWT Information frame reschedules all TWTs; otherwise, the value is set to 0.

The Next TWT subfield is of a variable size as determined by the Next TWT Subfield value. The value contained in the Next TWT subfield is the least significant portion of the TSF at the next TWT for the TWT specified by the TWT Flow Identifier subfield.

1.2. R-TWT Signaling

Figure 9:
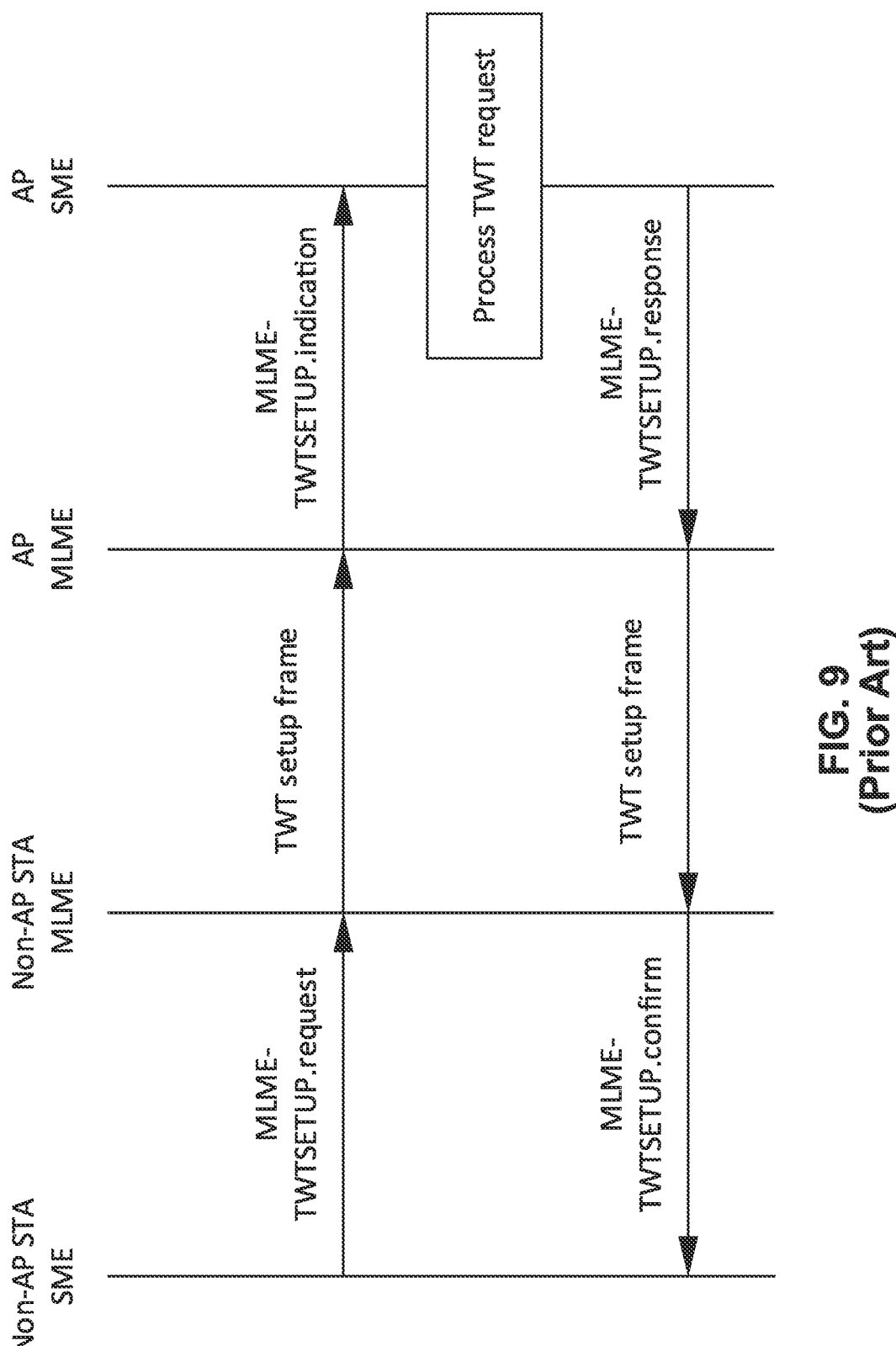
FIG. 9 is an interworking communications diagram of a TWT setup defined in IEEE 802.11ax.

FIG. 9 depicts an example of a TWT setup defined in IEEE 802.11ax. The interworking model of the STAs could be the same as defined in IEEE 802.11 standard.

The non-AP STA decides (determines) to initiate a TWT setup procedure with the AP. The Station Management Entity (SME) of the non-AP STA sends a MLME-TWT-SETUP.request message to its Medium Access Control (MAC) Sublayer Management Entity (MLME). When the MLME of the non-AP STA receives the MLME-TWT-SETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME.

Then, the SME of the AP processes the request and sends an MLME-TWTSETUP.response message containing TWT setup results to its MLME. Then, the MLME of the AP sends a TWT setup frame (i.e., TWT response frame) to the non-AP STA. The MLME of the non-AP STA receives the frame and sends an MLME-TWTSETUP.confirm message to its SME; from which the non-AP can recognize whether the TWT setup was successful or not.

Figure 10:
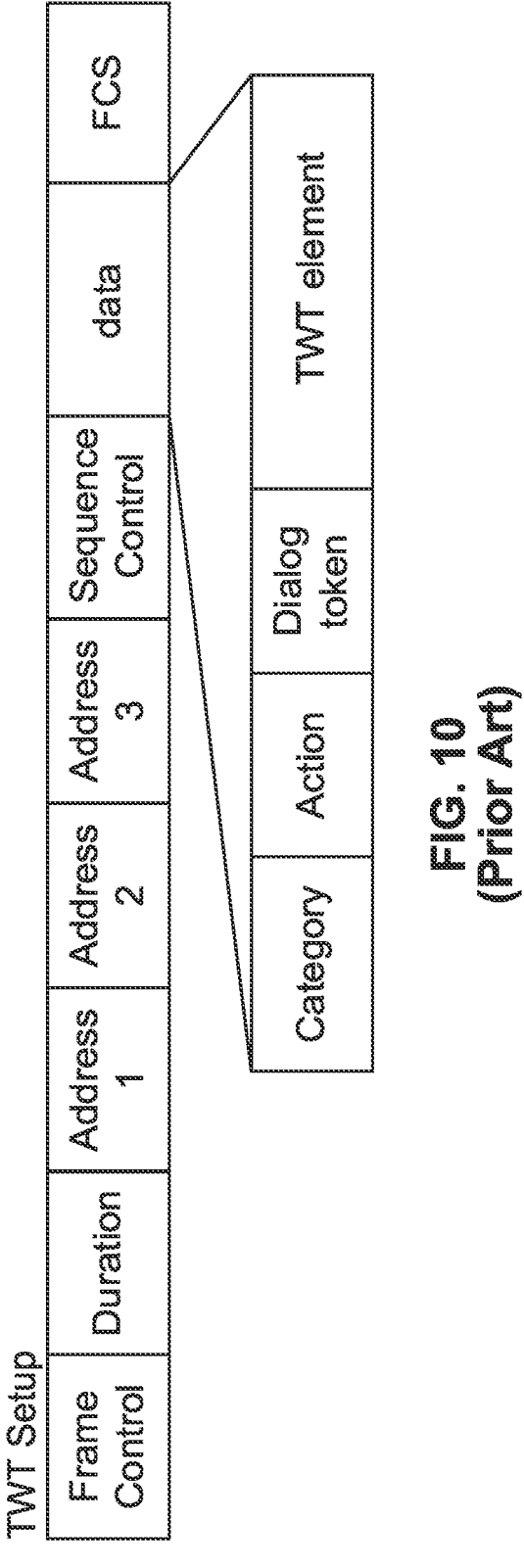
FIG. 10 is a data field diagram of a TWT Setup frame.

FIG. 10 depicts the format of a TWT Setup frame, whose TWT element in the frame as shown in FIG. 1. According to the definition in IEEE 802.11be, a Restricted TWT (R-TWT) scheduling AP, referred to as an R-TWT scheduling AP, is an EHT AP that supports restricted TWT operation and sets the Restricted TWT Support subfield in the transmitted EHT Capabilities elements to a value of 1.

A restricted TWT (R-TWT) scheduled STA, referred to as an R-TWT scheduled STA, is a non-AP EHT STA that supports restricted TWT operations and sets the Restricted TWT Support subfield in transmitted EHT Capabilities elements to a value of 1.

A R-TWT scheduled STA can establish membership of one or more R-TWTs scheduled by the R-TWT scheduling AP. The R-TWT setup signaling is the same as the broadcast TWT signaling with additional parameter settings, which are used for membership negotiation of a R-TWT between the R-TWT scheduled STA and the R-TWT scheduling AP. After a R-TWT scheduled STA establishes the membership of the R-TWT scheduled by the R-TWT scheduling AP, the R-TWT scheduled STA has higher priority or is allowed to exchange frames with the R-TWT scheduling AP during the SPs of the R-TWT. On the other hand, the R-TWT scheduled STA that is not a member of the R-TWT either has a lower priority or is not allowed to exchange frames with the R-TWT scheduling AP during the SPs of the R-TWT.

Figure 11:
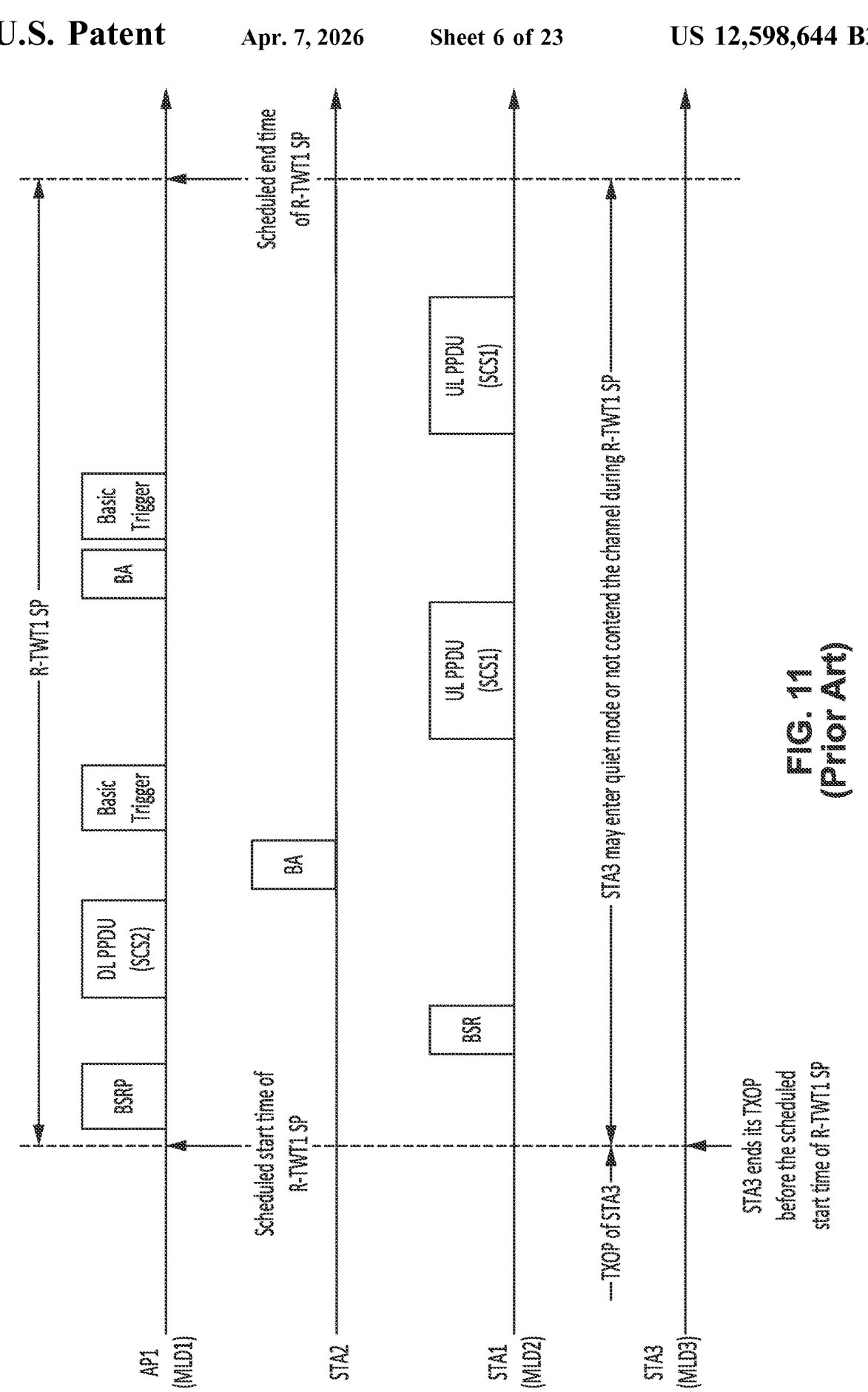
FIG. 11 is a communications diagram of an example for performing a R-TWT SP.

FIG. 11 depicts an example of performing a R-TWT SP. AP1 is an R-TWT scheduling AP which announces R-TWT1 scheduling and manages the members of R-TWT1. STA1 and STA2 are the member STAs of R-TWT1. During R-TWT1 SP, AP1 schedules and prioritizes frame exchange with the member STAs through Physical Layer Protocol Data Units (PPDUs), for example a UL PPDU of SCS1 with STA1, and a DL PPDU of SCS2 with STA2. STAs which can receive (hear) and recognize (understand) the R-TWT scheduling are called R-TWT scheduled STAs. STA3 is a R-TWT scheduled STA, but is not a member STA of R-TWT1. STA3 has to end its TXOP before the start time of R-TWT1 SP. STA3 can also enter quiet mode, or may decide not to contend for the channel during R-TWT1 SP. The scheduling AP can broadcast a quiet element to announce a quiet interval during a R-TWT SP, and the STA which receives (hears) this element may elect to enter quiet mode.

1.3. Additional Definitions and Notes

Enhanced Distributed Channel Access (EDCA):

The value of AIFSN[AC] shall be greater than or equal to 2 for non-AP STAs, and greater than or equal to 1 for APs.

Reverse Direction (RD):

The PPDU transmitted by a TXOP holder containing an RD grant (e.g., the Reverse Direction Grant (RDG) PPDU), which is indicated by the PPDU containing one or more +HTC MPDUs, in which the RDG/More PPDU subfield is equal to a value of 1. The STA transmitting the RDG PPDU is known as the RD initiator. The STA as addressed in the MPDUs of the RDG PPDU that transmits one or more PPDUs (the RD response burst) is known as the RD responder. Each RD exchange sequence within a single TXOP might be addressed to a different recipient, and any single recipient may be given more than one RDG within a single TXOP.

NFRP Trigger:

An AP may include the NDP Feedback Report Parameter (NFRP) Set element in Beacon frames, Probe Response frames and (Re)Association Response frames in order to modify parameters for NDP Feedback Report operation.

An HE AP sends an NFRP Trigger frame to solicit NDP feedback report responses from many non-AP STAs that are identified by a range of scheduled Association Identification (AIDs) in the Trigger frame.

The triggered sequential AIDs start from the "Starting AID" as indicated by the NFRP Trigger frame and with range capacity of NSTA (number of STAs)=18×2BW×(MultiplexingFlag+1).

Following the transmission from an AP of an NFRP Trigger frame, multiple STAs may simultaneously send NDP feedback report responses to the AP. A STA that is scheduled may send an NDP feedback report response in order to signal to the AP that it is in the awake state and that it might have frames in its queues for UL MU. Each STA that is scheduled is assigned a STARTING_STS_NUM and an RU_TONE_SET_INDEX to transmit a FEEDBACK_STATUS bit.

The AP can derive the list of AIDs from the resources of which an NDP feedback report response was sent, and their response. An AP that sent an NFRP Trigger frame to one or more non-AP STAs may send a BSRP Trigger frame to those non-AP STAs to obtain more precise buffer status information.

2. Problem Statement and Innovation

2.1. RD Problems and Innovations in R-TWT SP

The following are problems being addressed in the present disclosure. For pre-EHT devices the statement about the IEEE802.11be protocol which applied was: "If the RD initiator is an HE STA and the RD responder is an HE AP, the RD response burst may contain one or more Basic Trigger frames. The Basic Trigger frames shall trigger the RD initiator and at least one other STA in a full bandwidth UL MU-MIMO transmission." However, in considering herein an R-TWT design for EHT devices in 802.11be, that statement limits the scheduling flexibility of the R-TWT scheduling AP, which may not have to trigger the RD initiator in R-TWT SP when performing as a RD responder.

If the RD initiator is a HE STA and the RD responder is not the HE AP, the RD initiator does not know (cannot determine) if its peer node is a R-TWT member or not, it may send RDG PPDU with a request to its peer node to TX RD Data. However, if the RD responder is a non-R-TWT members it may have limited access to TX RD Data in current R-TWT SP.

Innovation for Problem 1:

The described RD protocol for EHT devices in R-TWT SP, during which the R-TWT scheduling AP does not have to trigger the RD initiator when it performs as the RD responder. In addition, when the R-TWT scheduling AP performs as the RD responder, it can trigger PPDU, for example SU TB PPDU(s) or MU TB PPDU(s).

Innovation for Problem 2:

The described RD protocol enables the RD initiator to inform its non-AP peer STA about the R-TWT info in the transmitted RD PPDU. In addition, the RD initiator is enabled to send a new MU RD PPDU to both the R-TWT scheduling AP and the non-AP peer STA, which allows the AP to quickly takeover the scheduling if the non-AP peer STA is a non-R-TWT member and has limited access (quiet or with low priority EDCA) in the current ongoing R-TWT SP.

2.2. NFRP in R-TWT SP

Problem:

The triggered sequential AIDs may contain R-TWT member STA AID, non-R-TWT member STA AID and pre-EHT STA AIDs. Not all STAs with triggered AIDs have unlimited Access to the R-TWT-SP. The current FEEDBACK_STATUS of the NFRP response is unable to reflect RTA related information.

Innovation:

The R-TWT scheduling AP may only trigger a response from R-TWT member STAs. The R-TWT scheduling AP may trigger all STAs while requesting new FEEDBACK_STATUS, which includes buffered Access Class/Traffic Information Identifier (AC/TID) traffic status and buffered RTA life expiration time in addition to the buffer threshold.

3. Embodiments

3.1. Communication Station (STA and MLD) Hardware

Figure 12:
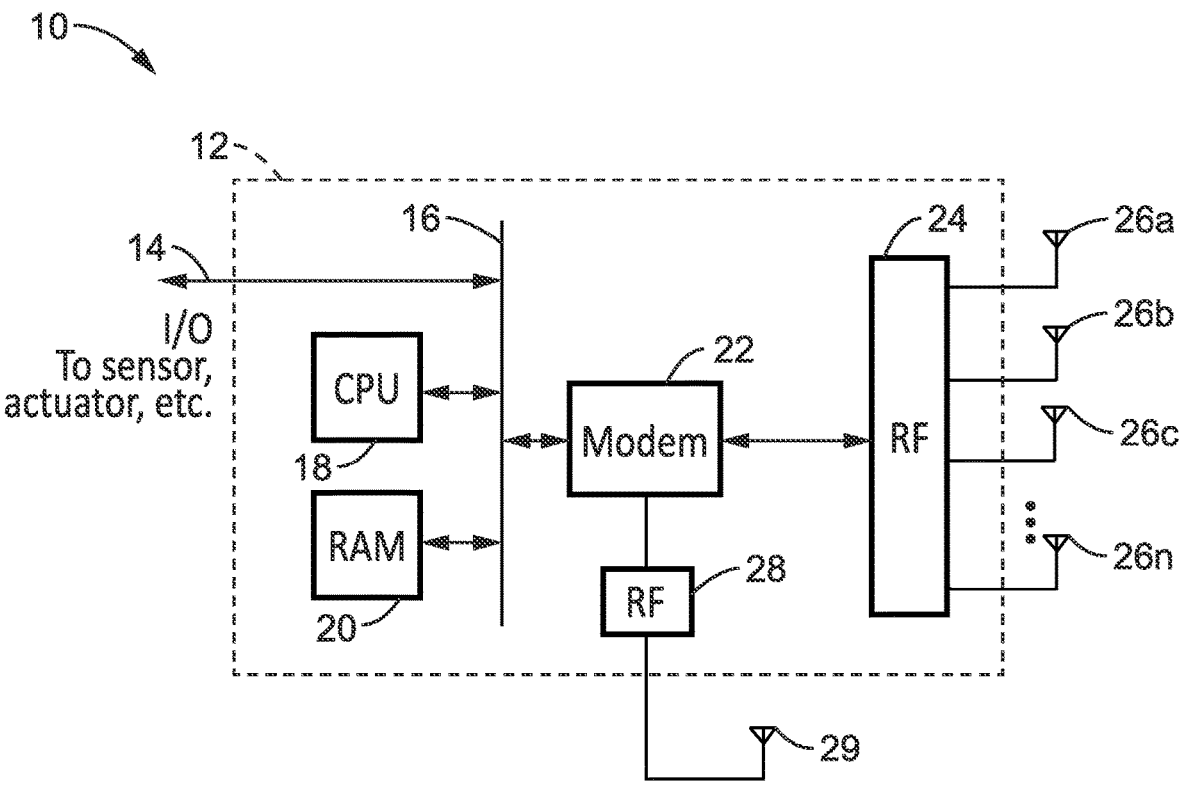
FIG. 12 is a block diagram of communication station hardware, according to at least one embodiment of the present disclosure.

FIG. 12 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 13:
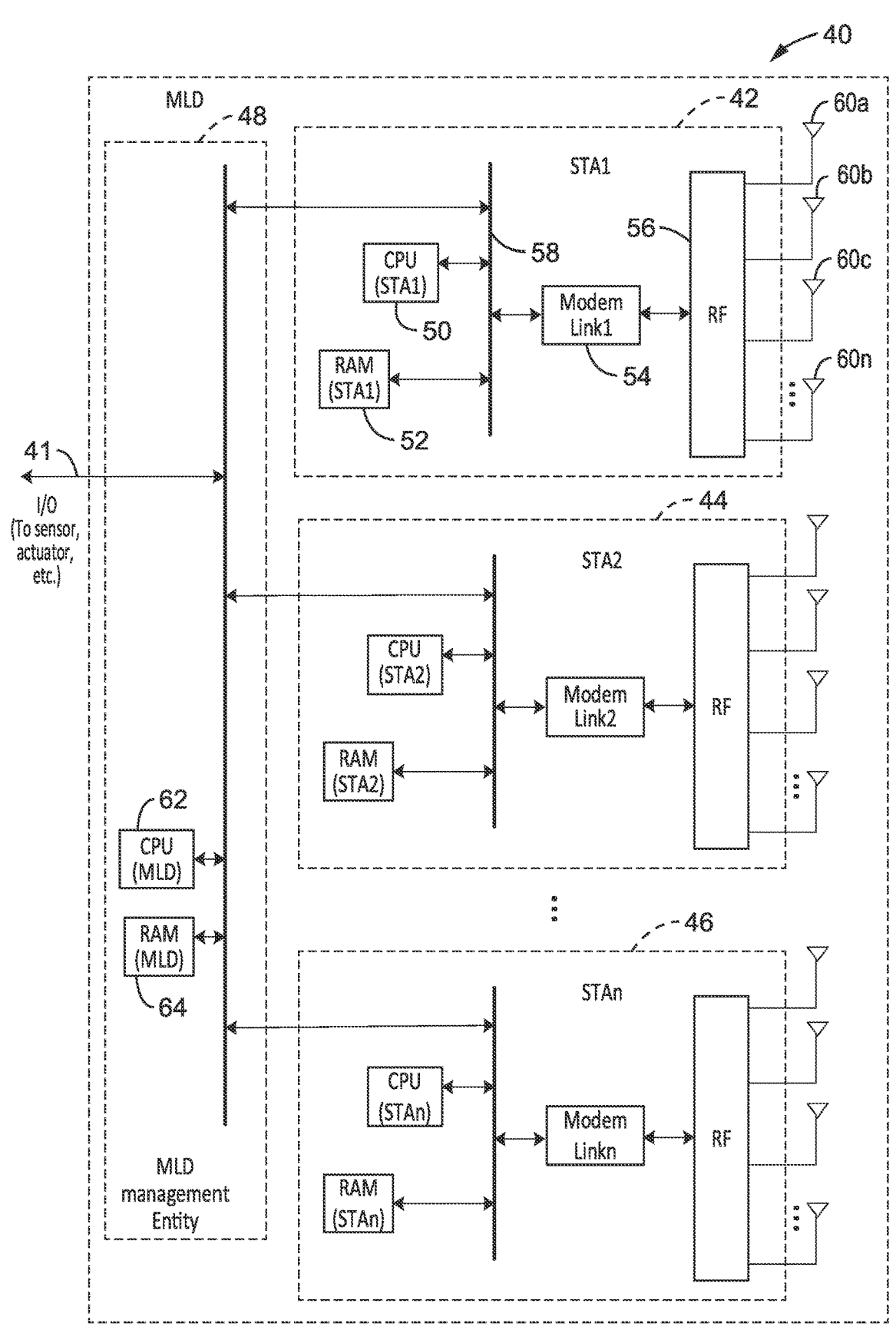
FIG. 13 is a block diagram Multi-Link Device (MLD) hardware according to at least one embodiment of the present disclosure.

FIG. 13 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60*a*, 60*b*, 60*c* through 60*n*, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

3.2. STA Topology Example

Figure 14:
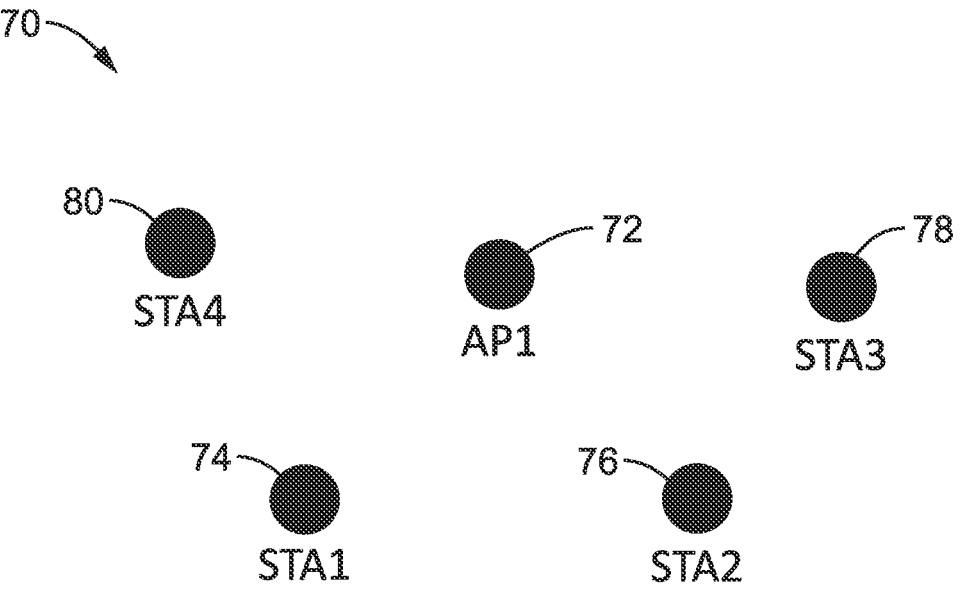
FIG. 14 is a network topology used in examples according to at least one embodiment of the present disclosure.

FIG. 14 illustrates an example STA topology 70 for consideration in the examples of the present disclosure. The figure is provided to aid in the discussions of the techniques involved towards engendering an improved understanding of the proposed technology. It should be appreciated that the present disclosure is in no way limited to the topology of this example, as the protocol may be utilized on communications between WLAN STAs and MLDs of any desired topology.

A Multi-Link Device (MLD) is a device that has more than one affiliated STA and has one Medium Access Control (MAC) Service Access Point (SAP) to Logical Link Control (LLC), which includes one MAC data service. An MLD is an AP MLD if APs are affiliated with that MLD. An MLD is a non-AP MLD if non-AP STAs are affiliated with that MLD.

As shown in FIG. 14 the scenario is exemplified as having five total stations shown as one Access Point (AP1) 72, and two non-AP STAs of STA1 74, STA2 76, STA3 78 and STA4 76 which communicate with the AP. All STAs use EDCA for random channel access.

It should be noted for this figure that AP1, STA1, STA2, STA3 and STA4 are in communication range of each other. STA1, STA2, STA3 and STA4 are EHT STAs that understand (configured for) R-TWT and are associated with AP1. AP1 has scheduled an R-TWT-X SP for STA1, STA2 and STA3, and a scheduled R-TWT-Y SP for STA4.

3.3. New RD Protocol in R-TWT SP 3.3.1. Detailed Innovation for Problem 1:

The RD initiator may transmit a RDG PPDU containing MPDUs addressed to the associated AP (RD responder).

If the RD initiator starts the RD TXOP inside the R-TWT SP, of which it has the R-TWT membership, the RD initiator STA may indicate if it grants the R-TWT scheduling AP, as the RD responder, complete scheduling capability. In this case, the R-TWT scheduling AP may not trigger the RD initiator in the RD response burst during the RD TXOP. In addition, a new subfield (e.g., named herein as R-TWT AP Grant) is created in the HT control field for EHT devices to grant complete scheduling capability to the AP, when that AP performs as the RD responder during R-TWT SP. And the AP as RD responder should not schedule transmissions that surpass the RD TXOP and should not interrupt the other R-TWT SP having different R-TWT IDs than that of the current R-TWT SP.

The R-TWT scheduling AP should acknowledge the RD initiator from which it receives the RDG PPDU and should indicate if it accepts the granted complete scheduling capability during the RD TXOP.

The R-TWT scheduling AP which has obtained granted complete scheduling capability can trigger a SU TB PPDU or a MU TB PPDU from R-TWT scheduled STAs.

The R-TWT scheduling AP with granted complete scheduling capability can transmit SU PPDU or MU PPDU to non-AP STA(s), that are member STA(s) of the current ongoing R-TWT SP.

The R-TWT scheduling AP with granted complete scheduling capability can send a MPDU from the valid MPDU list, e.g., QoS Data, QoS Null, Basic Trigger (BT), and so forth, to the RD initiator to terminate the granted complete scheduling capability in the granted RD TXOP. Additionally, the following holds. The RD initiator receives the MPDU from the R-TWT scheduling AP along with an indication of terminating the granted complete scheduling capability, and the RD initiator may not grant the AP complete scheduling capability during this RD TXOP. This information can be indicated in the new (R-TWT AP Grant) subfield in the HT control field.

3.3.2. Detailed Innovation for Problem 2:

A non-AP RD initiator may indicate the R-TWT information, such as with or without membership in the current R-TWT SP, or not as a R-TWT scheduled STA, and so forth, in a new "R-TWT Member" (R-TWT Mem) subfield in the HTC field of the transmitted RDG PPDU to its peer node. Following are additional details.

Upon receiving the RDG PPDU from the RD initiator which indicates it is a member of a current ongoing R-TWT SP, the recipient peer node needs to determine if it (itself) is a member of the R-TWT SP before responding. Specifically, if the recipient peer node is not a member of the current R-TWT SP, it may not respond as a RD responder; alternatively, it may respond with a Control Wrapper frame or a frame that serves a similar purpose, which can include an HT Control Field that carries the HT control field and includes setting the new (R-TWT Mem) subfield to 0 to indicate that it is not the R-TWT member of the current R-TWT. A few notes on this are in order. The decision of responding to a frame or not during current R-TWT SP, in which the peer node is not a member, is implementation dependent. It should be noted that if the AC constraint subfield (of the Control Information subfield format in a CAS Control subfield) is equal to 1 in the last frame received from an RD initiator, then the RD responder shall transmit Data frames of only the same AC as the last frame received from the RD initiator. In the current state of the art, if the AC constraint subfield is equal to 0, then the RD responder may transmit Data frames of any TID, or if the RD responder is affiliated to an MLD, of any TID that is mapped to that link.

In this disclosure, however, is described that the AC constraint field should be set to be consistent with the TIDs supported in the R-TWT SP. The RD initiator may grant the R-TWT scheduling AP a complete scheduling capability as described in Section 3.3.1 after receiving a response from the peer node which indicates it is not a member of current R-TWT SP, or after the timeout interval (i.e., aSIFSTime+aSlotTime+aRxPHYStartDelay) since the RD initiator finished transmitting the RDG PPDU to the peer node.

If the recipient peer node, of the RDG PPDU from the RD initiator, is a member of the current R-TWT SP, it should respond with an RD burst to the RD initiator with an indication that it has obtained membership in the current R-TWT SP in the new R-TWT Member subfield.

Upon receiving the RDG PPDU from the RD initiator, which indicates that it is NOT a member of the current ongoing R-TWT SP, the following conditions apply. If the recipient peer node is NOT a member of the current ongoing R-TWT SP, it may respond with an RD burst, or elect not to respond due to the limited access during current R-TWT SP (if any). The RD initiator may grant the R-TWT scheduling AP complete scheduling capability as proposed in Section 3.3.1 after the timeout interval since it has finished transmitting the RDG PPDU to the peer node.

If the recipient peer node is a member of the current ongoing R-TWT SP, it should respond with an RD burst to the RD initiator and include an indication that it has obtained membership in the current R-TWT SP.

Upon receiving the RDG PPDU from the RD initiator which has indicated that it is NOT a R-TWT scheduled STA; then the recipient peer STA should send an RD burst response based on the baseline rules.

The RD initiator may transmit MU RDG PPDU(s) to both the R-TWT scheduling AP and the peer node in different channels (if available), either with or without having the same CH_BANDWIDTH. More details of this are as follows.

The non-AP RD initiator may send a Control Wrapper frame, or a frame serving a similar purpose, which can include an HT Control Field, such as QoS Null+HTC to the R-TWT scheduling AP if it doesn't have any Data addressed to the AP.

In the RDG PPDU addressed to the R-TWT scheduling AP, the RD initiator informs the AP of the Address or AID of the peer node. Additional conditions are as follows. If the R-TWT scheduling AP recognizes that the reported peer node is not a member of current R-TWT SP, then the AP can respond with a MPDU from the valid MPDU list, such as Basic Trigger or QoS Null to perform as RD responder. If the R-TWT scheduling AP recognizes that the reported peer node is a member of the current R-TWT SP, then the AP shall not respond to the RD initiator as a RD responder. In this case, the peer node shall only respond to the RD initiator if it is a member of the current R-TWT SP.

If the RD initiator receives the R-TWT scheduling AP's RD response MPDU burst and is aware that the reported peer node is not a member of the current ongoing R-TWT SP, it should suspend transmission to that peer node.

If the RD initiator receives the response from the peer node, indicating that it is a member of the current ongoing R-TWT SP and is performing as a RD responder, the RD initiator should continue receiving the RD response bursts from the peer node. The next time when the RD initiator transmits RDG PPDU to the same peer node in the same R-TWT SP, which is identified by the R-TWT ID, it may not send an RDG PPDU to the R-TWT scheduling AP.

3.4. New NFRP Protocol in R-TWT SP 3.4.1. The R-TWT Scheduling AP Only Trigger Response from R-TWT Member STAs A special NFRP protocol is described which only triggers current R-TWT SP member STAs. The Starting AID field is set to a specific value, such as all ones, so that the Starting AID field is not recognized by pre-EHT STAs, but can be understand by EHT STAs. In addition, from the Starting AID field, EHT STAs recognize that this is a special NFRP and should check a new field, referred to herein as R-TWT Mem Grant, which may be used to reserve fields in the User Info field that indicate that the ongoing R-TWT SP is granted for R-TWT member STAs. Only the EHT STAs which are R-TWT members should respond.

The EHT STAs should use specific RU tones to reply to the NFRP response, the RU index RU_TONE_SET_INDEX parameter can be set with the following equation, with the value of the new "Prioritized Starting AID" subfield in the User Info field of the received special NFRP Trigger frame:

$$RU\_TONE\_SET\_INDEX=1+((AID-Prioritized\ Starting\ AID)\ mod\ (18/2^{BW}).$$

BandWidth (BW) is indicated in the UL BW subfield from the special NFRP Trigger frame.

The EHT STA shall respond with the special NFRP Trigger frame if its AID is greater than or equal to the Prioritized Starting AID carried in the received special NFRP Trigger and may be less than the Prioritized Starting AID+N STA. It will be noted that N STA is the total number of non-AP STAs that are scheduled to respond to the NFRP Trigger frame. $N\_STA=18\times2"BW\times$(value of the Number Of Spatially Multiplexed Users subfield+1). It should be noted that if EHT STAs respect the AID upper boundary, being less than Prioritized Starting AID+N_STA, then there may be some RUs not utilized. On the contrary, if EHT STAs do not respect the AID upper boundary and surpass the boundary, then the RUs may be utilized more efficiently at the risk of collisions occurring on some RU(s) that have been mapped with more than one AID which are AIDs of R-TWT member STAs. The design of the AID upper boundary is beyond the scope of this disclosure.

3.4.2. The R-TWT Scheduling AP Triggers all STAs with Request for New RTA_FEEDBACK_STATUS This disclosure describes a new FEEDBACK_STATUS operation. Other than the resource request buffer threshold, the AP may also request buffered AC/TID traffic status and/or buffered RTA life expiration time as another criteria. If all STAs are triggered using legacy NFRP and are requesting new RTA_FEEDBACK_STATUS, then the AP may assign RUs to non-R-TWT member STAs if they indicate urgent traffic in the new RTA_FEEDBACK_STATUS.

4. Flow Diagrams of Operations

4.1. RD Operation for the AP

Figure 15:
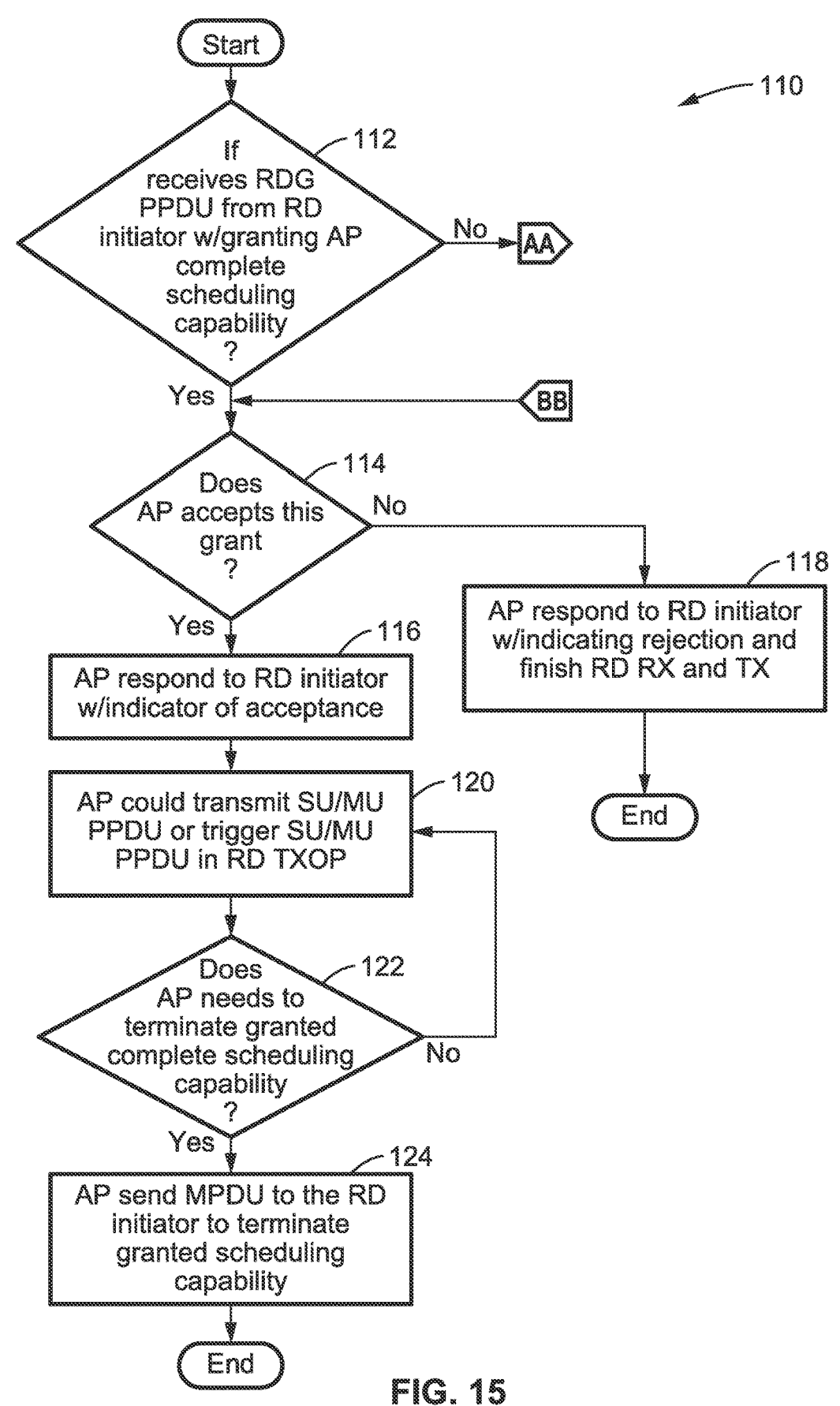
FIG. 15 and FIG. 16 is a flow diagram of RD operation in the AP according to at least one embodiment of the present disclosure.
Figure 16:
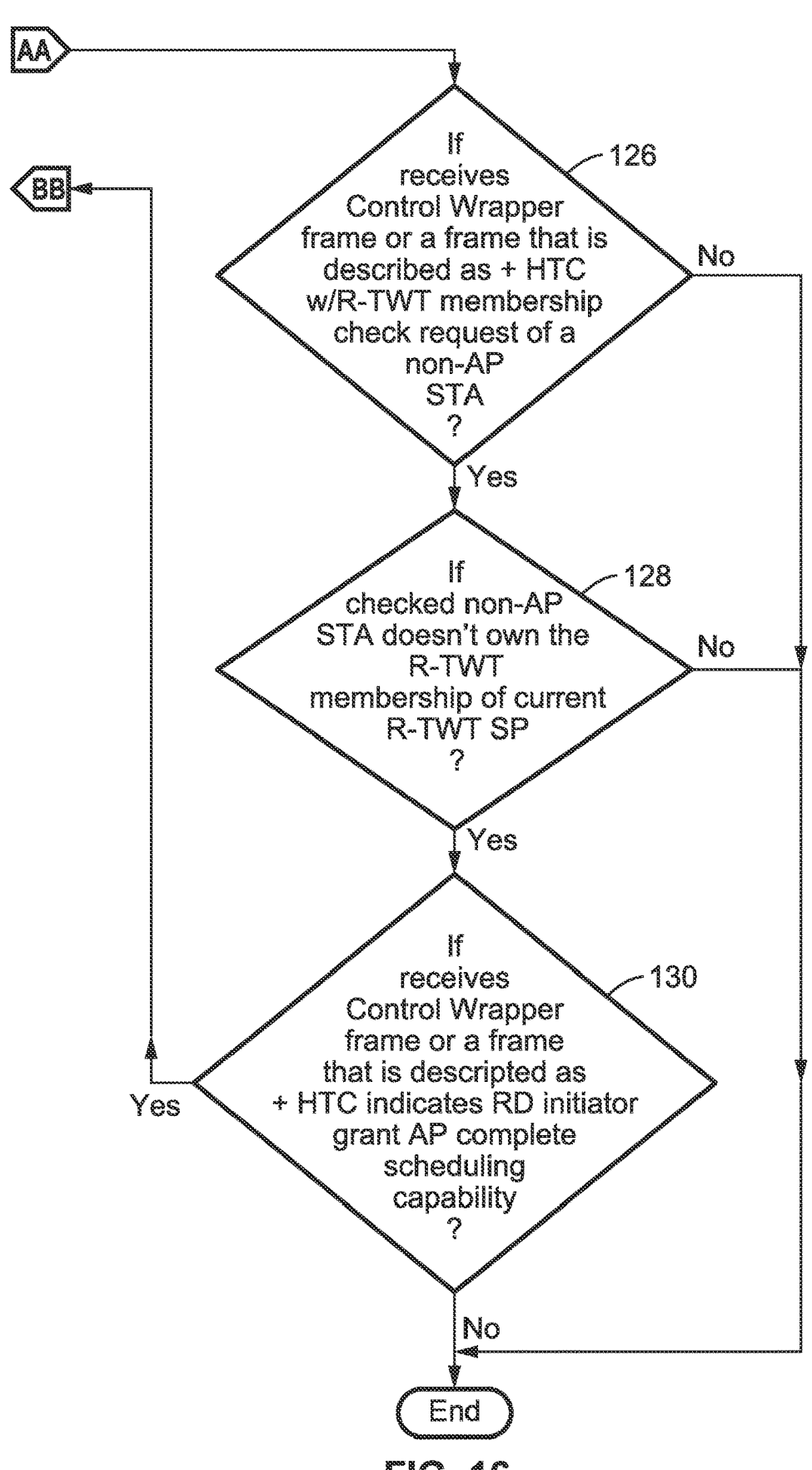

FIG. 15 and FIG. 16 illustrate an example embodiment 110 of RD operation in the AP. Check 112 determines if an RDG PPDU has been received from the RD initiator which grants the AP complete scheduling capability.

If this condition is met, then at block 114 the AP determines if it will accept this grant. If it is not accepted, then at block 118 the AP responds to the initiator indicating a rejection of the grant, and completing RD reception (RX) and transmission (TX) and the process ends.

Otherwise, with the condition at check 114 met, at block 116 the AP responds to the initiator indicating its acceptance of the grant. Then at block 120 the AP can transmit SU/MU PPDA or trigger SU/MU PPDU in the RD TXOP.

Check 122 then determines if the AP needs to terminate the granted complete scheduling capability. If termination is not required, then execution returns to block 120. Otherwise, execution reaches block 124 in which the AP sends an MPDU to the RD initiator to terminate granted scheduling capability, and the process ends.

Returning back to consider check 112 when the condition is not met, execution is seen moving to check 126 of FIG. 16. Check 126 determines if the AP has received a Control Wrapper frame or a frame that is described as +HTC w/R-TWT membership check request of a non-AP STA. If the condition is not met, then the process ends.

Check 128 determines if the checked non-AP STA does not have (lacks) an R-TWT membership in the current R-TWT SP. If the condition is not met, then the process ends, otherwise execution proceeds to check 130.

Check 130 determines if the AP has received a Control Wrapper frame or a frame that is described as +HTC indicates an RD initiator grant AP complete scheduling capability. If condition is not met, then the process ends, otherwise, execution moves to block 114 of FIG. 15, which was already described.

Figure 17:
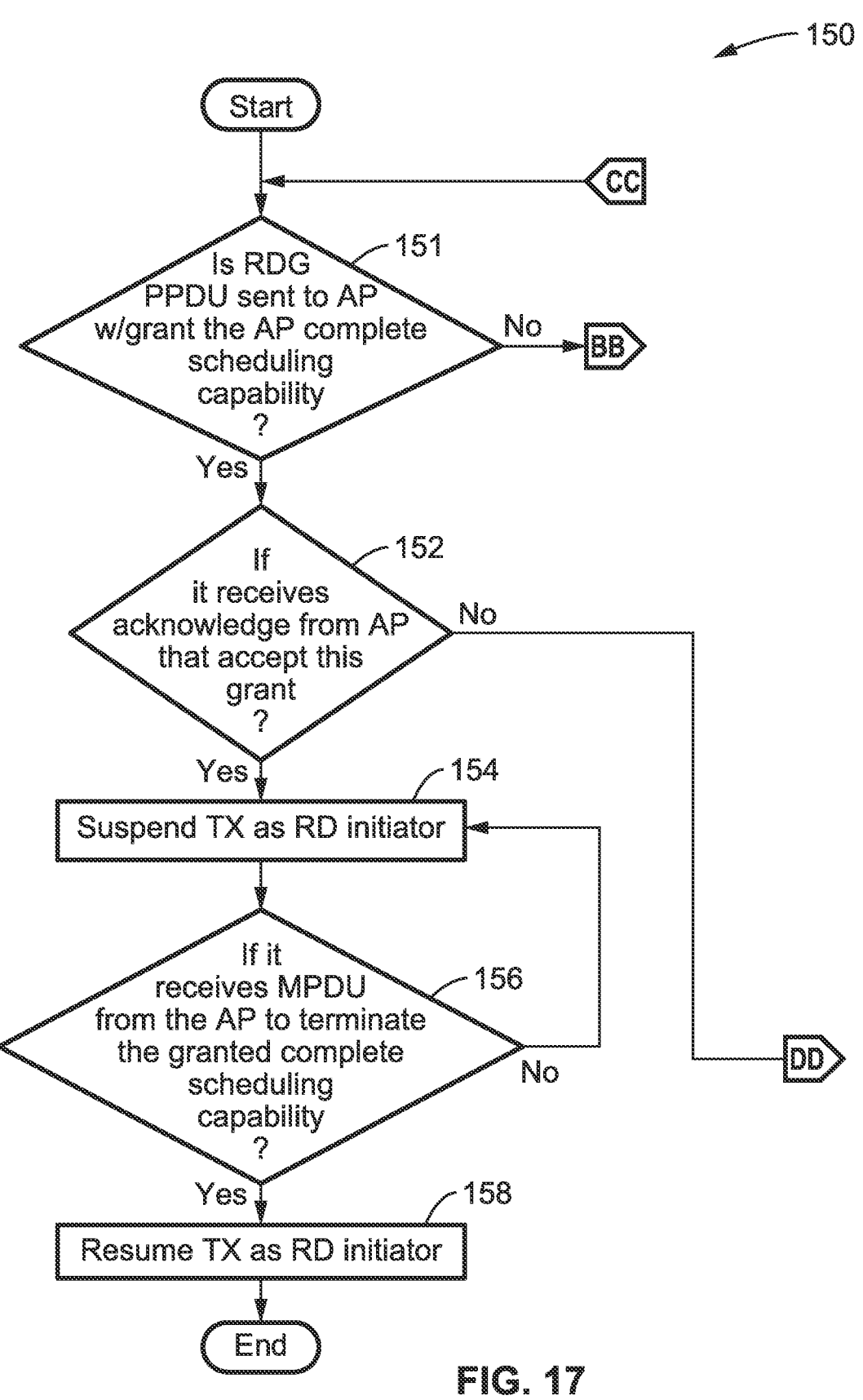
FIG. 17 and FIG. 18 is a flow diagram of RD initiator as a non-AP STA according to at least one embodiment of the present disclosure.
Figure 18:
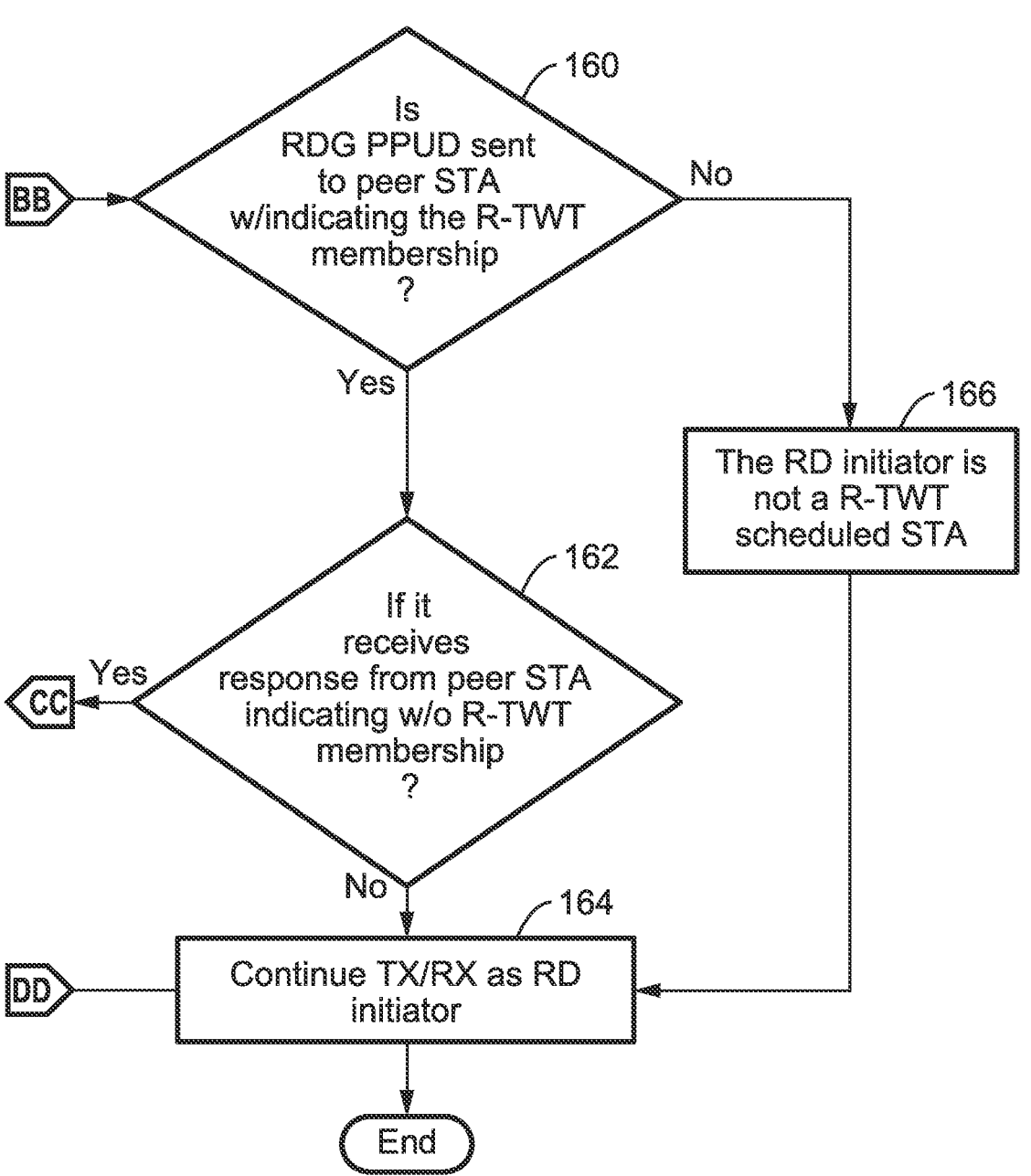

FIG. 17 and FIG. 18 illustrate an example embodiment 150 of an RD initiator as a non-AP STA. At check 151 the non-AP STA determines if an RDG PPDU is sent to the AP with a grant for complete scheduling capability. If the condition is met, then at block 152 a check determines if the non-AP has received an acknowledgement from the AP that accepts this grant. If the condition is met, then at block 154 transmissions are suspended as RD initiator.

In block 156 a check determines if the non-AP STA has received an MPDU from the AP to terminate the granted complete scheduling capability. If the condition is not met, then execution returns to block 154. Otherwise, at block 158 transmissions (TX) are resumed as the RD initiator.

Returning back to considering check 151 when the condition is not met, execution reaches block 160 of FIG. 18, which checks if the RDG PPDU is sent to a peer STA including an indication of R-TWT membership. If the condition is not met, then at block 166 it has been determined that the RD initiator is not a R-TWT scheduled STA, and then at block 164 transmission/reception (TX/RX) are continued as an RD initiator, and the process ends.

Otherwise, if the condition of block 160 is met, then at block 162 it is determined if the non-AP STA has received a response from the peer STA indicating that it lacks a R-TWT membership. If this condition is not met, then execution reaches block 164. Otherwise, if the condition is met, then execution returns to block 151 of FIG. 17.

Returning back to considering check 152 in the case of the condition not being met, in which case execution moves to block 164 of FIG. 18, which has already been discussed.

4.2. NFRP Operations

Figure 19:
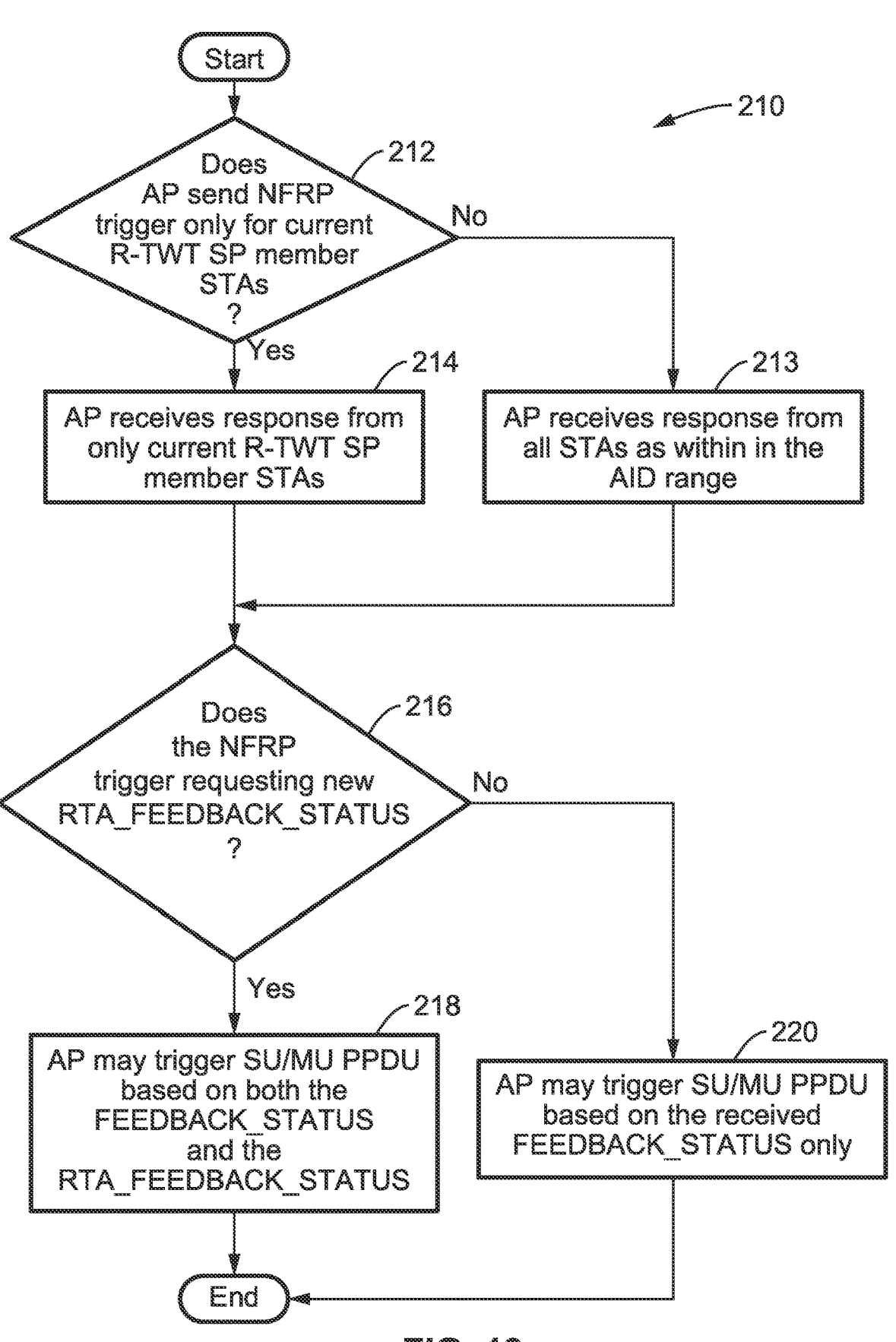
FIG. 19 is a flow diagram of NFRP operations for the AP according to at least one embodiment of the present disclosure.

FIG. 19 illustrates an example embodiment 210 of NFRP operations for the AP. Check 212 determines whether the AP will send an NFRP trigger only for the R-TWT SP member STAs. If the condition is not met, then at block 213 the AP receives a response from all STAs as within the AID range, and execution moves to check 216. Otherwise, if the condition is met, then at block 214 the AP receives a response from only the current R-TWT SP member STAs, and execution moves to check 216.

At check 216 it is determined if the NFRP trigger is requesting new RTA_FEEDBACK_STATUS. If the condition is not met, then in block 220 the AP may trigger SU/MU PPDU based on the received RTA_FEEDBACK_STATUS only, and the process ends.

Otherwise, if new status is requested then at block 218 the AP may trigger a SU/MU PPDU based on both the FEEDBACK_STATUS and the RTA_FEEDBACK_STATUS, after which the process ends.

Figure 20:
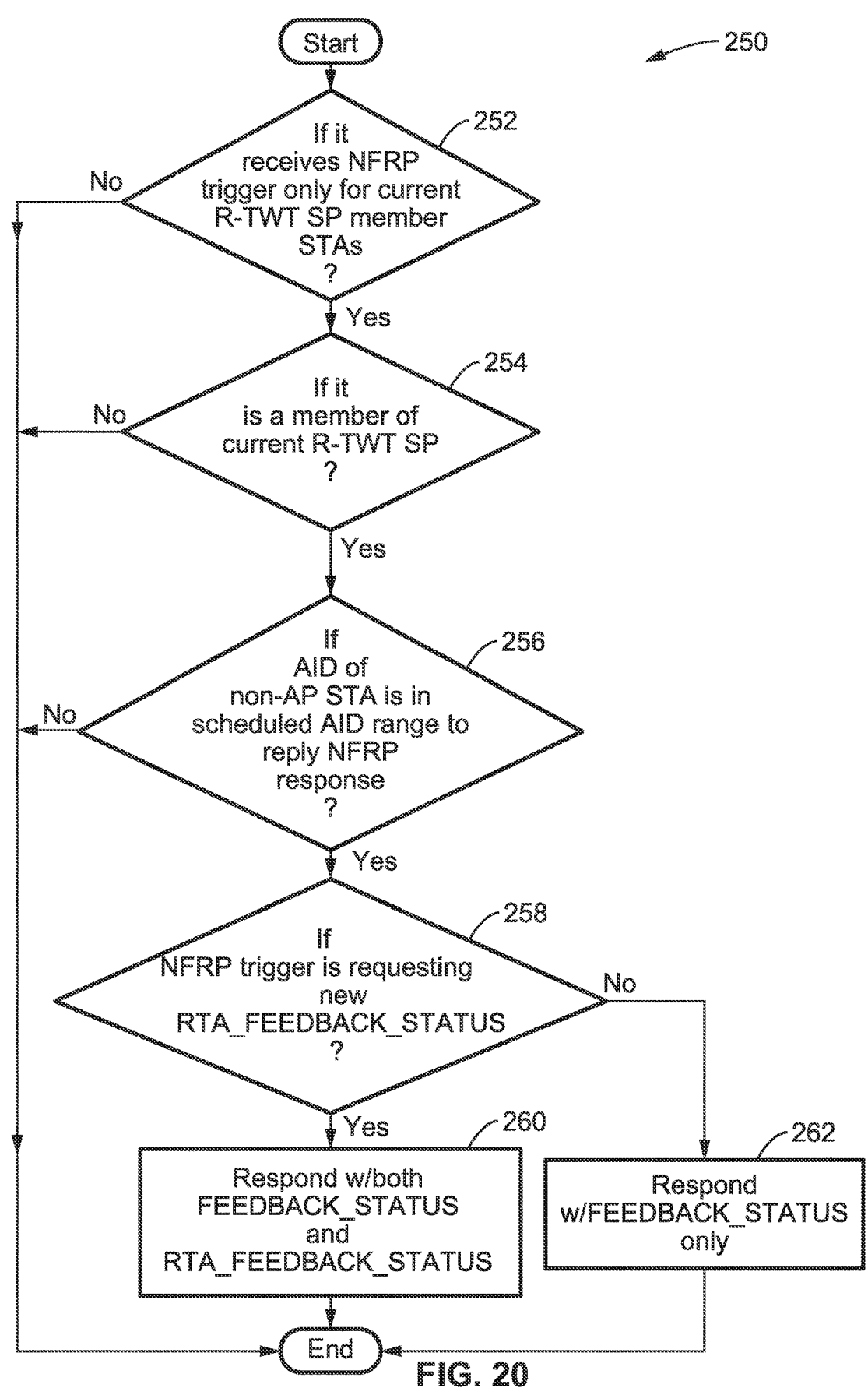
FIG. 20 is a flow diagram of NFRP operations for a non-AP STA according to at least one embodiment of the present disclosure.

FIG. 20 illustrates an example embodiment 250 of NFRP operations for a non-AP STA. In check 252 the non-AP STA determines if it has received NFRP trigger for only the current R-TWT SP member STAs. If the condition is not met, then the process ends. If the condition is met, then execution reaches check 254.

Check 254 determines if the non-AP STA is a member of the current R-TWT SP. If the condition is not met, then the process ends. If the condition is met, then execution reaches check 256.

Check 256 determines if the AID of the non-AP STA is in the scheduled AID range to reply to the NFRP response. If the condition is not met, then the process ends. Otherwise, at check 258 it is determined if the NFRP trigger is requesting new RTA_FEEDBACK_STATUS. If new status is not requested, then at block 262 the non-AP STA responds with FEEDBACK_STATUS only and processing ends.

Otherwise, at block 260 the non-AP STA responds with both FEEDBACK_STATUS and RTA_FEEDBACK_STATUS and processing ends.

5. New Frames and Fields

FIG. 21 illustrates an example embodiment 270 of a non-China Millimeter-wave Multiple Gigabit (CMMG) Variant HT Control field format. This HT Control field is always present in a Control Wrapper frame and is present in the Quality of Service (QoS) Data and Management frames as determined by the +HTC subfield of the Frame Control field.

The AC Constraint subfield of the HT Control field indicates whether the mapped AC of an RD Data frame is constrained to a single AC, as defined in Table 1, at the end of the specification. The RDG/More PPDU subfield of the HT Control field is interpreted differently depending on whether it is transmitted by an RD initiator or an RD responder, as shown in Table 2.

In a non-HE STA, the RDG/More PPDU subfield and AC Constraint subfield is present in HT variant and VHT variant of the HTC field as shown in Table 3.

FIG. 22 illustrates an example embodiment 290 of an A-Control subfield as defined in HE variant of the HTC field. The control List subfield contains one or more Control subfields, within which the Control ID value=6 indicates the Command and status (CAS) control with the frame format defined in FIG. 23.

FIG. 23 illustrates an example embodiment 310 for an HE STA having the RDG/More PPDU subfield and the AC Constraint subfield present in the CAS Control field. In an EHT STA, the CAS Control subfield is the same as that in an HE STA, with a new subfield being define here as shown in FIG. 24.

FIG. 24 illustrates an example embodiment 320 of a Control Information subfield format in a CAS Control subfield with R-TWT AP Grant, R-TWT Info, and R-TWT Peer Address Check subfield. In an EHT STA, the CAS Control subfield indicates to the RD initiator/responder STA as to whether the transmitted frame is with or without a membership in the current ongoing R-TWT SP, or if it is outside of any R-TWT SP. The new subfield is denoted as "R-TWT Member" subfield with detailed definition in Table 4.

A RD initiator, as an EHT STA with a R-TWT membership in the current ongoing R-TWT SP, may send RDG PPDU to its peer non-AP STA including setting the new R-TWT Member subfield to a value (e.g., 1) to indicate that the RD initiator is in the R-TWT SP, of which it has obtained membership. If the RD initiator has not obtained membership in the current ongoing R-TWT SP, then it should set the R-TWT Member subfield to a value (e.g., 0) to indicate that information. If the RD initiator is not a R-TWT scheduled STA, it leaves the R-TWT Member subfield empty.

A RD responder as an EHT STA having R-TWT membership in the current ongoing R-TWT SP, may send an RD response burst to the RD initiator which includes setting the new R-TWT Member subfield to a first state (e.g., 1) to indicate that it has obtained membership in the current ongoing R-TWT SP. If the RD responder does not have membership in the current ongoing R-TWT SP, it should set the R-TWT Member subfield to a second state (e.g., 0). If the RD initiator is not a R-TWT scheduled STA, it leaves the R-TWT Member subfield empty.

Upon receiving the RDG PPDU from the RD initiator which indicates its membership in the current ongoing R-TWT SP, the recipient peer non-AP STA needs to determine if it is a member of the current ongoing R-TWT SP before responding.

If the recipient peer non-AP STA is not a member of the current R-TWT SP, it may not respond as a RD responder. Alternatively, the peer non-AP STA may respond with a frame, such as BA+HTC which includes the new R-TWT Member subfield set to indicate (e.g., 0) that it is not an R-TWT member in the current R-TWT.

It should be noted that the decision of responding with a frame or not, during the current R-TWT SP, of which the peer non-AP STA does not own membership can be determined for the specific implementation.

The RD initiator may grant the R-TWT scheduling AP complete scheduling capability as discussed in Section 3.3.1 after it receives a response from the peer non-AP STA who indicates that it is not a member of current R-TWT SP or after the timeout interval (i.e., aSIFSTime+aSlotTime+aRx-PHYStartDelay) since the RD initiator finished transmitting the RDG PPDU to the peer STA.

If the recipient peer STA is a member of the current ongoing R-TWT SP, it should transmit an RD response burst to RD initiator which indicates in the new R-TWT Member subfield that it has obtained membership in the current R-TWT SP.

Upon receiving the RDG PPDU from the RD initiator, which indicates it is not a member of the current ongoing R-TWT SP, the following conditions apply. If the recipient peer non-AP STA is not a member of the current ongoing R-TWT SP, then it may respond with an RD burst, or elect not to respond due to the limited access during current R-TWT SP (if applicable). The RD initiator may grant the R-TWT scheduling AP complete scheduling capability as described in Section 3.3.1 after the timeout interval since it finished transmitting the RDG PPDU to the peer STA. However, if the recipient peer non-AP STA is a member of the current ongoing R-TWT SP, then it should respond with an RD burst to the RD initiator and indicate it has membership in the current R-TWT SP.

Upon receiving the RDG PPDU from the RD initiator which indicates it is not a R-TWT scheduled STA, the recipient peer STA should send an RD burst response based on the baseline rules.

In an EHT STA, a new subfield was described as seen in FIG. 24 for the CAS Control subfield to indicate that the recipient STA should check a specific Address field (e.g., Address 4) of the MAC header, as seen in FIG. 25, of the received RDG PPDU from a RD initiator.

FIG. 25 illustrates an example embodiment 330 of a data frame format, depicted having subfields of Frame control, Duration, Address1 through Address3, Sequence Control, Address4, QoS Control, HT Control, and Frame Body.

When a non-AP RD initiator starts a RD TXOP inside a R-TWT SP and has a RDG PPDU to send to its peer non-AP STA, the non-AP RD initiator does not know (cannot determine) if the peer STA is a member of the current R-TWT SP. So instead of only sending a SU RDG PPDU to the peer STA, the RD initiator can send a MU RDG PPDU to both the peer STA and the R-TWT scheduling AP and inform the AP of the Address of the peer STA.

The new subfield is denoted herein as "R-TWT Peer Address Check", having a setup status set to a first state (e.g., 1) to indicate that an Address check is required, and set to a second state (e.g., 0) to represent that an Address check is not required.

The specific Address field is preconfigured and contains the Destination Address of the peer STA that the MU RDG PPDU is addressed to. The RD initiator can request the R-TWT scheduling AP, as the other recipient of the MU RDG PPDU, to check this Address field.

The R-TWT scheduling AP checks the preconfigured Address field that contains the address of the peer STA and can thus determine membership for the peer STA.

If the peer STA is not a member of the current ongoing R-TWT SP, then the R-TWT scheduling AP should send an RD response burst as a RD responder and gain the TXOP.

If the peer STA is a member of the current ongoing R-TWT SP, the R-TWT scheduling AP should not respond to the MU RDG PPDU. The peer STA will respond as a RD responder and gains the TXOP.

It should be noted that the Address 4 field in the MAC header of DATA frame is determined by the setting of the To DS and From DS subfields of the Frame Control field. Then the Address 4 field can be utilized since it is originally in N/A status when "To DS" does not equal to 1 and/or the "From DS" does not equal 1 as shown in Table 5. The setting of "To DS"=1 and "From DS"=1 is for using in mesh BSSs by S1G relays or by a GLK STA, as stated in Table 6, does not apply to STAs in this disclosure.

Alternatively, if the non-AP RD initiator does not use Address 4 as mentioned above to carry the MAC address of its peer STA, it may carry the AID of the peer STA in the A-Control subfield of HE variant HT Control field.

5.2. NFRP Trigger Frame w/R-TWT Member Grant and RTA Feedback Status Check

FIG. 26 illustrates an example embodiment 370 of a user information field format in the NFRP trigger frame. A new User Info field format in the NFRP Trigger frame based on this figure. The Starting AID subfield defines the first AID of the range of AIDs that are scheduled to respond to the NFRP Trigger frame.

The R-TWT scheduling AP can set the Starting AID subfield to a specific value, e.g., all ones, so that the Starting AID subfield cannot be recognized by pre-EHT STAs but can be understood (recognized) by EHT STAs. The Feedback Type, as shown in Table 7, is set to 0 to indicate the scheduled STA may respond with an NFDP response in order to signal to the AP that it is in the awake state and that it might have frames in its queues for a UL MU. The UL Target Receive Power subfield indicates the expected receive signal power, measured at the AP's antenna connector and averaged over the antennas. The Number Of Spatially Multiplexed Users subfield indicates the number of STAs that are multiplexed on the same set of tones in the same RU.

FIG. 27 illustrates an example embodiment 370 of a User Info field format in the NFRP Trigger frame with R-TWT Member Grant. As shown in the figure a new subfield is defined and denoted herein as an "R-TWT Member Grant" subfield of the User Info field of the NFRP Trigger frame as defined in FIG. 26.

The new R-TWT Member Grant subfield can use one of the Reserved bits to indicate that the ongoing R-TWT SP is granted for R-TWT member STAs if set to a first state (e.g., 1); otherwise, it is set to a second state (e.g., 0).

Upon receiving the NFRP Trigger frame indicating the NFRP TXOP is a grant for R-TWT members, the recipient EHT STA should only transmit an NFRP response to the R-TWT scheduling AP if it is a member of the current ongoing R-TWT SP and if its AID is greater or equal to the Prioritized Starting AID carried in the received special NFRP Trigger and should be less than Prioritized Starting AID+N_STA.

N_STA is the total number of non-AP STAs that are scheduled to respond to the NFRP Trigger frame.

N_STA=$18 \times 2^{BW} \times$(value of the Number Of Spatially Multiplexed Users subfield+1).

The new RTA Feedback Status Check subfield is setup by the R-TWT scheduling AP during a R-TWT SP when the scheduling AP requests each scheduled non-AP STA to transmit new RTA_FEEDBACK_STATUS bit(s) in addition to the FEEDBACK_STATUS bit. The new RTA Feedback Status Check could use one or some of the Reserved bits.

The FEEDBACK_STATUS bit, as defined in Table 8, indicates the awake status of the non-AP STA and buffer status as to whether it is exceeding the resource request buffer threshold or not. The new RTA_FEEDBACK_STA-TUS bit(s) could carry the buffered RTA traffic information, such as buffered AC/TID traffic status and/or buffered RTA life expiration, and the like.

Each STA that is scheduled is assigned a STARTING_ST-S_NUM and an RU_TONE_SET_INDEX to transmit the FEEDBACK_STATUS bit and the RTA_FEEDBACK_STATUS bit(s).

The scheduled EHT STA receiving the NFRP Trigger frame with the new RTA Feedback Status Check subfield setup should respond with buffered RTA traffic information using the RTA_FEEDBACK_STATUS bit(s) to the scheduling AP if its AID is greater or equal to the Prioritized Starting AID carried in the received special NFRP Trigger and shall be less than Prioritized Starting AID+N_STA. Upon receiving the RTA_FEEDBACK_STATUS bit(s) from non-AP STAs, the scheduling EHT AP may assign RUs to those non-R-TWT member STAs which indicate urgent traffic in the new RTA_FEEDBACK_STATUS.

The new Prioritized Starting AID subfield defines the first AID of the range of AIDs that should respond to the NFRP Trigger with R-TWT Member Grant subfield setup and/or with RTA Feedback Status Check subfield setup.

6. Example Communications 6.1. RD Exchange Sequence in R-TWT SP

Figure 28:
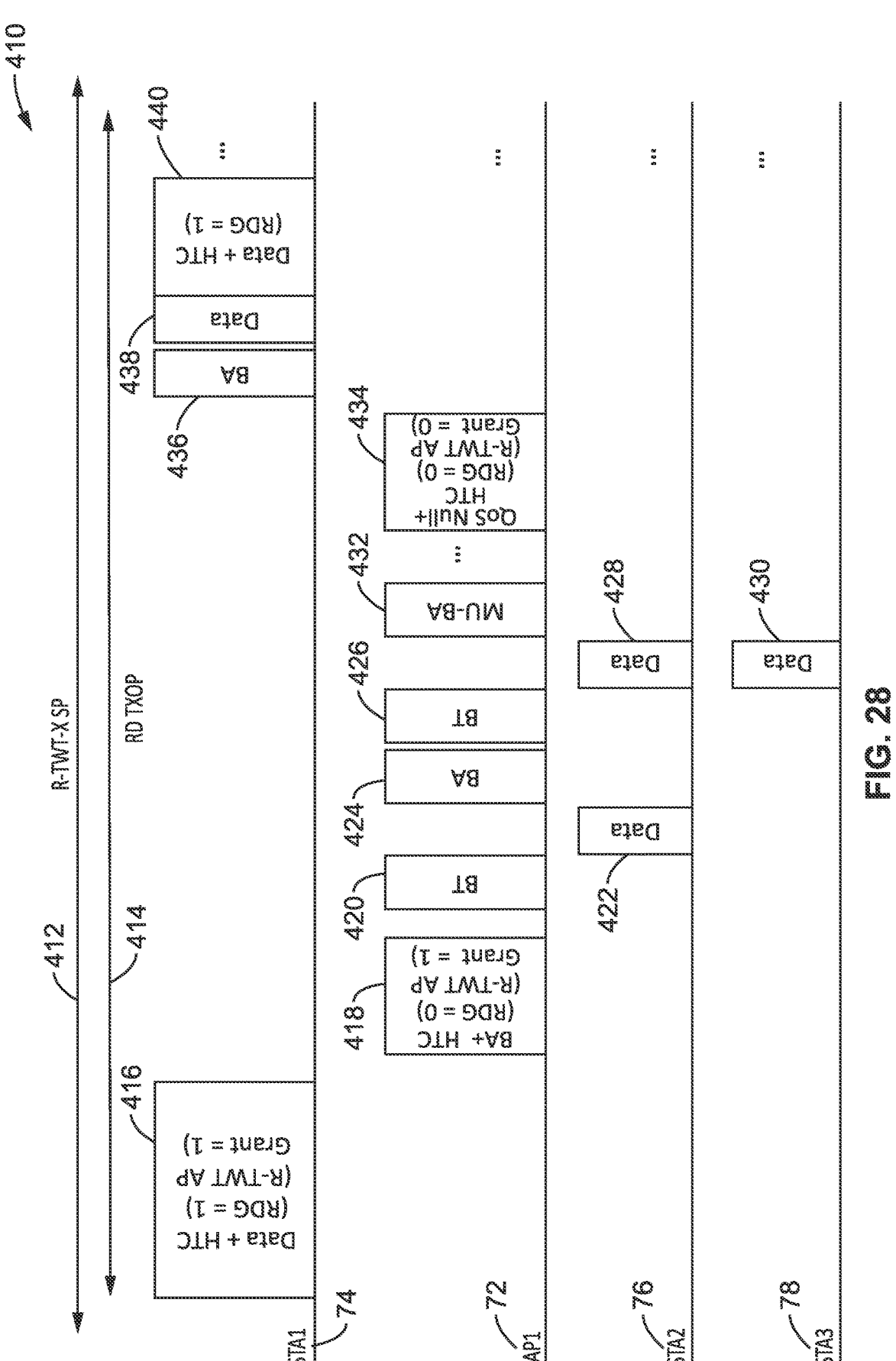
FIG. 28 is a communications diagram of an RD exchange sequence in an R-TWT SP with granting the AP complete scheduling ability according to at least one embodiment of the present disclosure.

FIG. 28 illustrates an example embodiment 410 of an RD exchange sequence in R-TWT SP with granting the AP complete scheduling ability. The example shows interaction between AP1 72 and STA1 74, STA2 76 and STA3 78.

Intervals are shown for R-TWT SP-X SP 412 and RD TXOP 414. In the RD TXOP, the RD initiator STA1 transmits a PPDU 416 containing MPDUs addressed to AP1 (RD responder). One or more MPDUs within this PPDU with the RDG/More PPDU subfield set to 1, indicating an RDG. The RD initiator STA1 grants complete scheduling capability to the AP in R-TWT-X SP by indicating this in the new field denoted, herein as R-TWT Grant, of the HT control field.

The RD responder AP1 responds to the RD initiator with the transmission of a +HTC BlockAck frame 418 in which the RDG/More PPDU subfield is set to 0, indicating that no other PPDU will follow a SIFS after the end of the PPDU containing the BlockAck. The new field (R-TWT Grant) has an indication in the HT control field that the AP performs all scheduling as the RD responder, and it may not trigger the RD initiator in this RD TXOP.

AP1 gains the granted control of the TXOP and transmits a Basic Trigger (BT) frame 420 to STA2, which is a member of R-TWT-X SP. Upon receiving the BT from the R-TWT scheduling AP1, STA2 can send a SU TB PPDU(s) 422 to AP1 using allocated RUs as indicated in the BT. AP1 should respond with a BA/Ack 424 to STA2 after receiving the UL SU TB PPDU(s) from STA2.

AP1 transmits a Basic Trigger frame 426 to STA2 and STA3, which are members of R-TWT-X SP. Upon receiving the BT from the R-TWT scheduling AP1, STA2 and STA3 can send an MU TB PPDU(s) 428 and 430 to AP1 using allocated RUs as indicated in the BT. AP1 should respond with a MU-BA 432 to STA2 and STA3 after receiving the UL MU TB PPDU(s) from STA2 and STA3.

AP1 transmits a QoS Null frame 434 to the RD initiator with an indication of terminating the granted complete scheduling capability in the RD TXOP, by setting the new field (R-TWT Grant) in the HT control field. The RD initiator should respond with a BA 436 to the R-TWT scheduling AP1. The RD initiator regains the TXOP and transmit P2P PPDUs 438 to STA2 indicating 440 an RDG in the RDG/More PPDU subfield.

Figure 29:
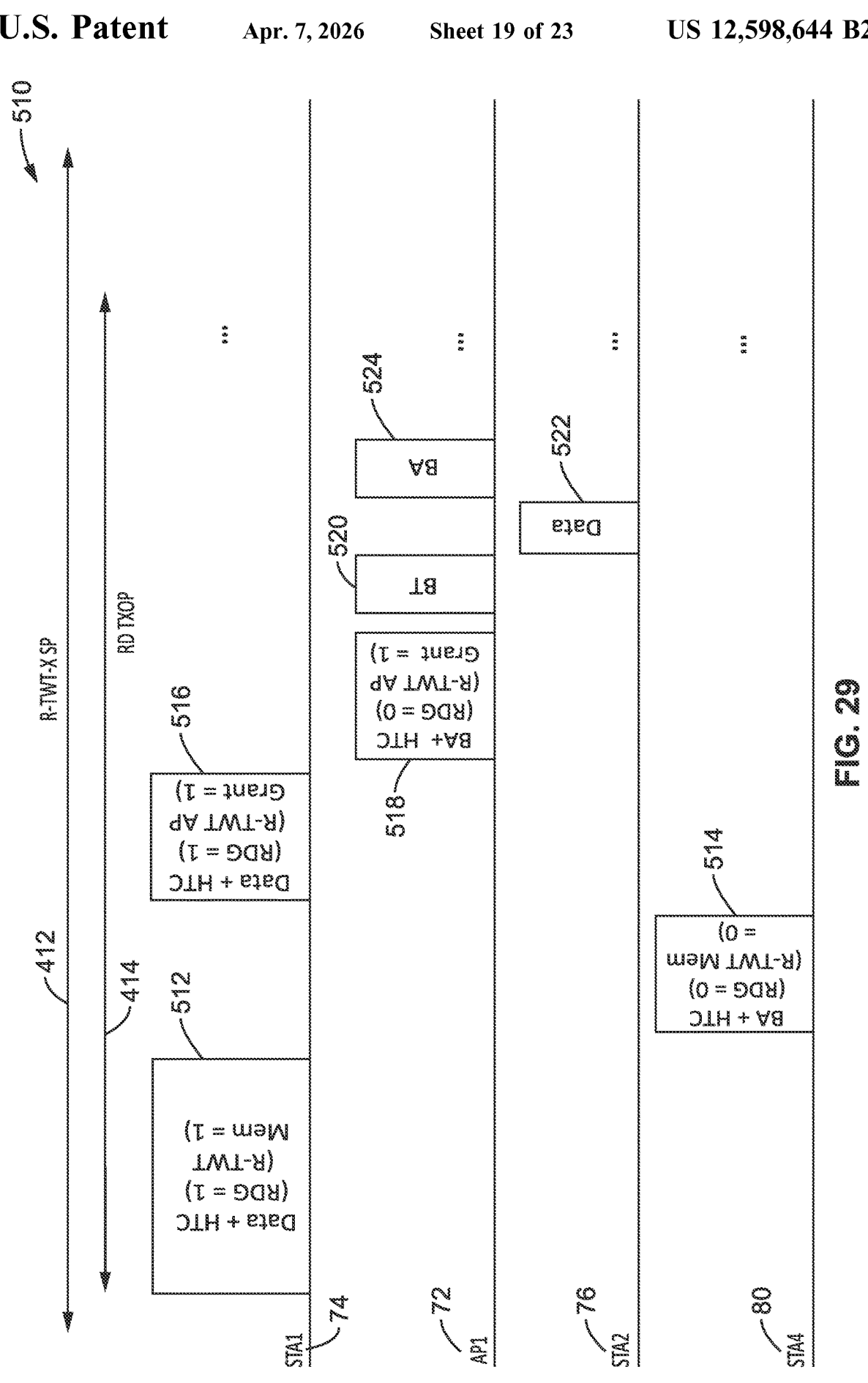
FIG. 29 is a communications diagram of an RD exchange sequence in an R-TWT SP for P2P according to at least one embodiment of the present disclosure.

6.2. RD Initiator w/R-TWT SP Membership and RD Responder w/o R-TWT SP membership FIG. 29 illustrates an example embodiment 510 of an RD exchange sequence in R-TWT SP for P2P (RD initiator w/R-TWT SP membership and RD responder w/o R-TWT membership). The example depicts interactions between AP1 72 and STA1 74, STA2 76 and STA4 78.

An R-TWT-SP 412 is shown within which the RD initiator STA1 in a RD TXOP 414, transmits a PPDU 512 containing MPDUs addressed to STA4 (RD responder). One or more MPDUs within this PPDU with the RDG/More PPDU subfield set to 1, indicating an RDG. The RD initiator STA1 indicates that it has membership in the current ongoing R-TWT-X SP by indicating this in the new field denoted as R-TWT Member of the HT control field.

The RD responder STA4 responds to the RD initiator with the transmission of a +HTC BlockAck frame 514 in which the RDG/More PPDU subfield is set to a second state (e.g., 0), indicating that no other PPDU will follow a SIFS after the end of the PPDU containing the BlockAck. The new field of R-TWT Member is set to a second state (e.g., 0) in the HT control field to indicate it is not a member of current ongoing R-TWT-X SP.

The RD initiator STA1 transmits a PPDU 516 containing MPDUs addressed to AP1 (new RD responder). One or more MPDUs within this PPDU with the RDG/More PPDU subfield set to a first state (e.g., 1), indicating an RDG. The RD initiator STA1 grants complete scheduling capability to the AP in R-TWT-X SP by indicating this in the new field denoted as R-TWT Grant of the HT control field, which is acknowledged 518 with a BA+HTC with RDG=0 and R-TWT AP Grant=1.

AP1 gains the granted control of the TXOP and transmits a Basic Trigger frame 520 to STA2, which is a member of R-TWT-X SP. Upon receiving the BT from the R-TWT scheduling AP1, STA2 can send SU TB PPDU(s) 522 to AP1 using allocated RUs as indicated in the BT. AP1 should respond with a BA/Ack 524 to STA2 after receiving the UL SU TB PPDU(s) from STA2.

Figure 30:
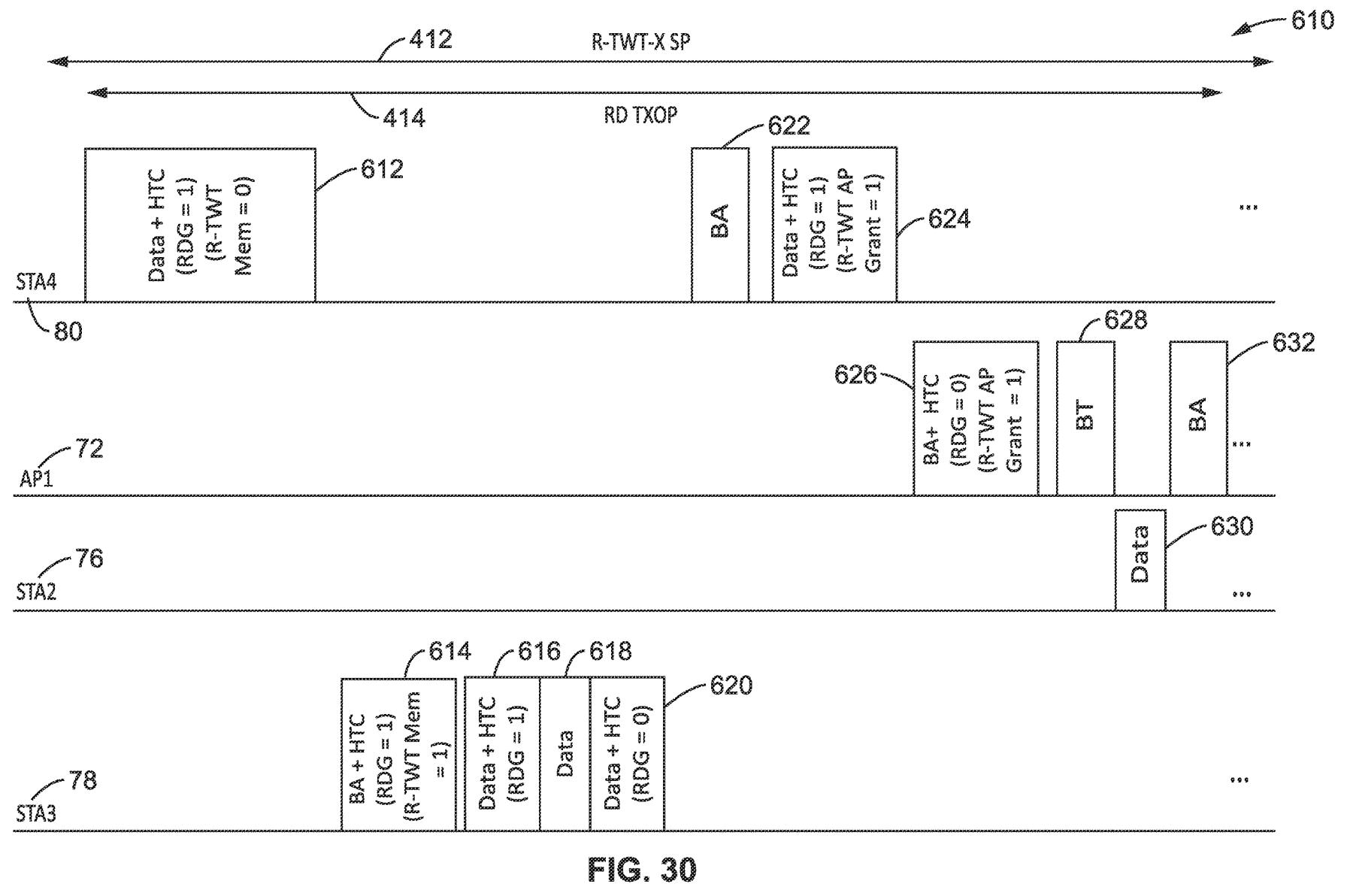

6.3. RD Initiator w/o R-TWT SP Membership and RD Responder w/R-TWT SP Membership FIG. 30 illustrates an example embodiment 610 of an RD exchange sequence in R-TWT SP for P2P (RD initiator without an R-TWT SP membership and RD responder with an R-TWT membership). The example depicts interactions between AP1 72 and STA2 76, STA3 78, and STA4 80.

An R-TWT-SP 412 is shown within which the RD initiator STA4 transmits within a RD TXOP 414 a PPDU 612 containing MPDUs addressed to STA3 (RD responder). One or more MPDUs within this PPDU with the RDG/More PPDU subfield set to a first state (e.g., 1), indicating an RDG. The RD initiator STA4 indicates that it does not have membership in the current ongoing R-TWT-X SP by indicating this in the new field denoted as R-TWT Member of the HT control field.

The RD responder STA3 responds to the RD initiator with the transmission of a +HTC BlockAck frame 614 in which the following is performed. The RDG/More PPDU subfield is set to a first state (e.g., 1), indicating that another PPDU will follow a SIFS after the end of the PPDU containing the BlockAck. In addition, an indication is set in the new R-TWT Member field in the HT control field indicating that it is the member of current ongoing R-TWT-X SP.

STA3 transmits PPDUs 616, 618 and 620 in a response burst to STA4. PPDU 616 has the RDG/More PPDU subfield set to a first state (e.g., 1) indicating that more PPDUs are forthcoming. The last PPDU 620 also contains one or more +HTC MPDUs in which the RDG/More PPDU subfield is set to a second state (e.g., 0) to indicate that this is the last PPDU in the response burst.

The RD initiator STA4 regains control of the TXOP and transmit a BlockAck frame 622 to STA3 to acknowledge the MPDUs transmitted by STA3 in the RD response burst.

The RD initiator STA4 transmits a PPDU 624 containing MPDUs addressed to AP1 (new RD responder). One or more MPDUs within this PPDU with the RDG/More PPDU subfield set to a first state (e.g., 1), indicating an RDG. The RD initiator STA4 grants complete scheduling to the AP in R-TWT-X SP by indicating this in the new field denoted as R-TWT Grant of the HT control field. AP1 acknowledges 626 receipt with BA+HTC with RDG=0 and R-TWT AP Grant=1.

AP1 gains the granted control of the TXOP and transmits a Basic Trigger frame 628 to STA2, which is a member of R-TWT-X SP. Upon receiving the BT from the R-TWT scheduling AP1, STA2 can send SU TB PPDU(s) 630 to AP1 using allocated RUs as indicated in the BT. AP1 should respond with a BA/Ack 632 to STA2 after receiving the UL SU TB PPDU(s) from STA2.

6.4. RD Initiator Transmits MU RDG PPDU and Informs AP of Peer STA Address

Figure 31:
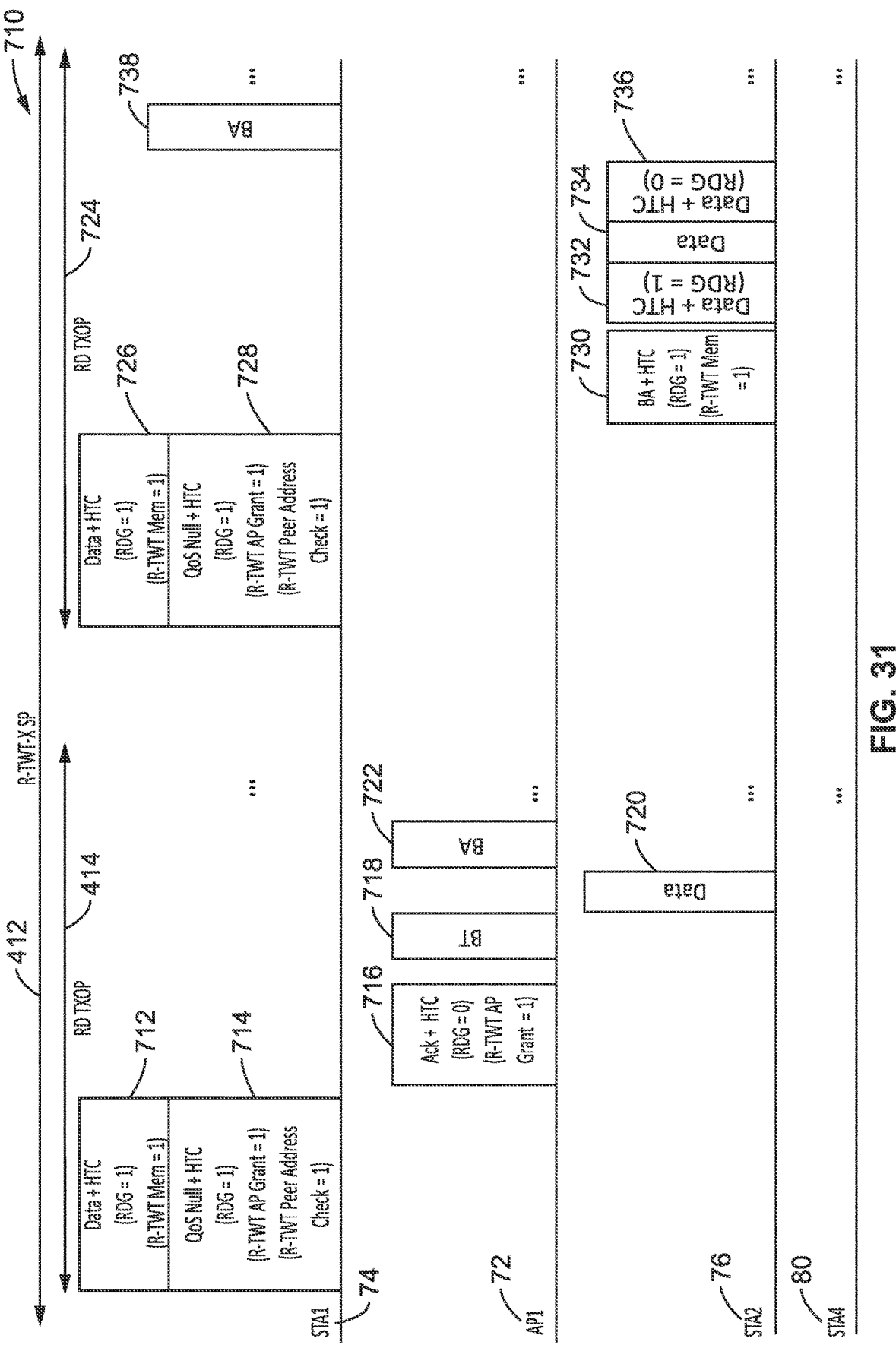
FIG. 31 is a communications diagram of an RD exchange sequence in R-TWT-X SP with RD initiator informing the AP of a peer address through MU RDG according to at least one embodiment of the present disclosure.

FIG. 31 illustrates an example embodiment 710 of an RD exchange sequence in R-TWT-X SP with RD initiator informing AP the peer's Address through MU RDG PPDU. As in the previous figures, the example shows interaction between AP1 72 and STA1 74, STA2 76 and STA4 80.

An R-TWT-X SP 412 is shown within which a first RD TXOP 414 is performed. The RD initiator STA1 transmits a MU RDG PPDU containing MPDUs 712 and 714, addressed to STA4 and AP1, respectively. In the PPDUs addressed to STA4 and AP1, one or more MPDUs within this PPDU have the RDG/More PPDU subfield set to a first state (e.g., 1), indicating an RDG. The RD initiator STA1 transmit QoS Null 714 in the RDG PPDU addressed to the AP, since STA1 does not have any Data to transmit to AP1 at this time. In the PPDU 712 addressed to STA4, the RD initiator STA1 indicates that it has membership in the current ongoing R-TWT-X SP by indicating this in the new R-TWT Member subfield of the HT control field.

In the PPDU addressed to AP1, the RD initiator STA1 grants complete scheduling to the AP in R-TWT-X SP by indicating this in the new R-TWT Grant subfield of the HT control field. The RD initiator STA1 also indicates an Address check is requested for AP1 by setting the new R-TWT Peer Address Check subfield to a first state (e.g., 1).

Upon receiving the RDG PPDU from RD initiator STA1, the peer STA4 does not respond to the RD initiator since it is not a member of the current R-TWT-X SP.

Upon receiving the RDG PPDU from RD initiator STA1, AP1 checks the peer address of STA4 based on the request as indicated in the new R-TWT Peer Address Check subfield. AP1 recognizes that STA4 is not a member of the current ongoing R-TWT-X SP, AP1 then responds as the RD responder.

The RD responder AP1 responds to RD initiator STA1 with the transmission of a +HTC Ack frame 716 in which the following takes place. The RDG/More PPDU subfield is set to a second state (e.g., 0), indicating that no other PPDUs will follow a SIFS after the end of the PPDU containing the Ack. An indication is also set in the new R-TWT Grant field in the HT control field to let the AP take over complete scheduling as the RD responder, and that it may not trigger the RD initiator in this RD TXOP.

AP1 gains the granted control of the TXOP and transmits a Basic Trigger frame 718 to STA2, which is a member of R-TWT-X SP. Upon receiving the BT from the R-TWT scheduling AP1, STA2 can send SU TB PPDU(s) 720 to AP1 using allocated RUs as indicated in the BT. AP1 then responds with a BA/Ack 722 to STA2 after receiving the UL SU TB PPDU(s) from STA2.

In a second RD TXOP 724 of the R-TWT-X SP 710, the RD initiator STA1 sends a MU RDG PPDU containing MPDUs 726 and 728 addressed to STA4 and AP1, respectively. In the PPDUs addressed to STA2 and AP1, one or more MPDUs within this PPDU with the RDG/More PPDU subfield set to a first state (e.g., 1), indicating an RDG. The RD initiator STA1 transmit QoS Null in the RDG PPDU addressed to AP, since STA1 does not have Data to transmit to AP1 at this time.

In the PPDU addressed to STA2, the RD initiator STA1 indicates that it has membership in the current ongoing R-TWT-X SP by indicating this in the new R-TWT Member subfield of the HT control filed.

In the PPDU addressed to AP1, the RD initiator STA1 grants complete scheduling to AP in R-TWT-X SP by indicating this in the new R-TWT Grant subfield of the HT control filed. The RD initiator STA1 also indicates Address check is request for AP1 by setting the new R-TWT Peer Address Check subfield to a first state (e.g., 1).

Upon receiving the RDG PPDU from the RD initiator STA1, AP1 checks the Address of peer STA2 based on the request as indicated in the new R-TWT Peer Address Check subfield. AP1 recognizes STA2 is a member of the current ongoing R-TWT-X SP. AP1 then does not respond as the RD responder.

Upon receiving the RDG PPDU from the RD initiator STA1, peer STA2 as a member of R-TWT-X SP, responds to RD initiator STA1 with the transmission of a +HTC Block-Ack frame 730 in which the RDG/More PPDU subfield is set to a first state (e.g., 1), indicating that another PPDU will follow a SIFS after the end of the PPDU containing the BlockAck. It also indicates in the new field of R-TWT Member in the HT control field for indicating it is a member of the current ongoing R-TWT-X SP.

STA2 transmits a PPDUs 732, 734 and 736 to STA4 that contain one or more +HTC MPDUs in which the RDG/More PPDU subfield is set to a second state (e.g., 0) to indicate that this is the last PPDU in the response burst.

STA1 acknowledges these PPDUs with BA 738.

6.5. NFRP Trigger R-TWT Members with an R-TWT Member Grant

Figure 32:
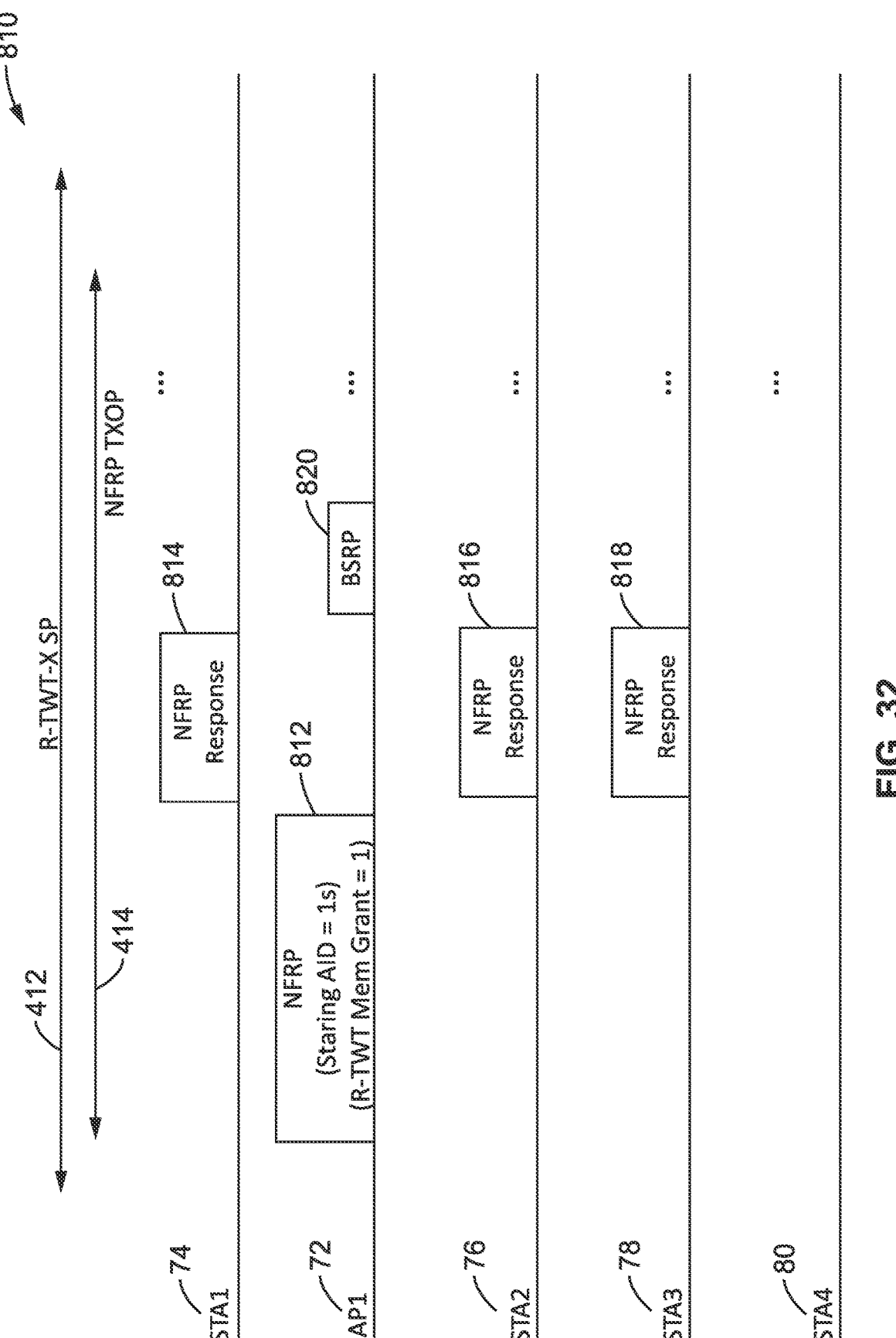
FIG. 32 is a communications diagram of an NFRP trigger, containing an R-TWT Member Grant subfield, which triggers NFRP responses from R-TWT members according to at least one embodiment of the present disclosure.

FIG. 32 illustrates an example embodiment 810 of NFRP trigger R-TWT members w/R-TWT Member Grant subfield. This example shows interaction between AP1 72 and STA1 74, STA2 76, STA3 78 and STA4 80.

An R-TWT-SP 412 is shown within which the AP1 gains the TXOP 414 inside the R-TWT-X SP and sends an NFRP frame 812 with the following settings. The Starting AID is set to a specific value, for example all ones, so that the pre-EHT STAs will be unable to recognize it and shall not respond. The new R-TWT Mem Grant subfield is set to, for example stage 1.

Upon receiving the NFRP frame from the R-TWT scheduling AP1, the following takes place. EHT STA1, STA2, and STA3 as members of R-TWT-X SP, should send the NFRP responses 814, 816 and 818 in the assigned RU tone. EHT STA4 is not a member of R-TWT-X SP, so it should not respond to the NFRP.

AP1 derives the list of AIDs from STA1, STA2, and STA3 of which an NFDP response was sent, and their response. AP1 may send a BSRP Trigger frame 820 to STA1, STA2, and STA3 to obtain more precise buffer status information.

6.6. NFRP Trigger R-TWT Members w/Obtaining RTA Traffic Status

Figure 33:
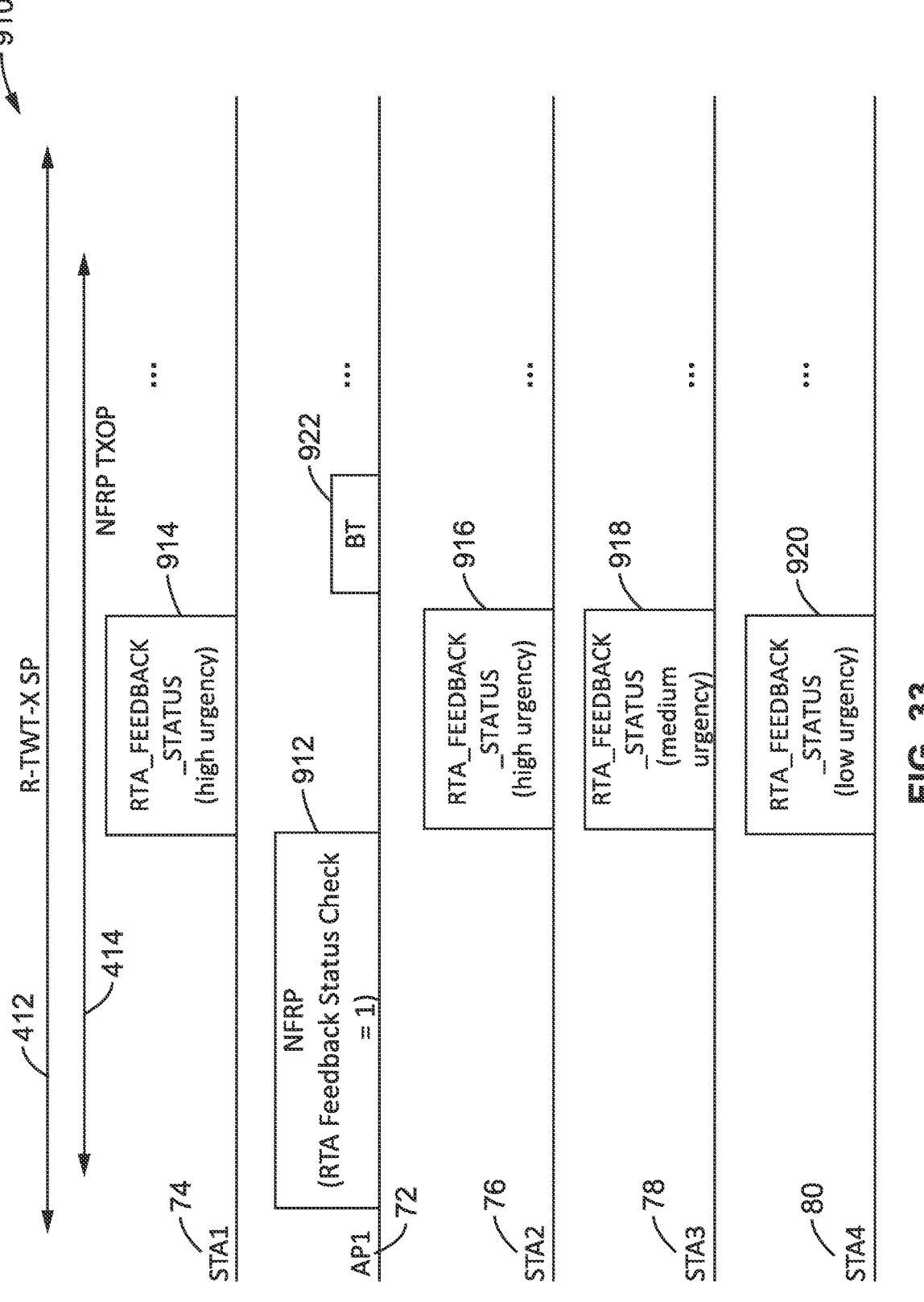
FIG. 33 is a communications diagram of an NFRP triggering R-TWT members with an RTA feedback status check subfield according to at least one embodiment of the present disclosure.

FIG. 33 illustrates an example embodiment 910 of an NFRP triggering R-TWT members with an RTA feedback status check subfield. As in the previous figure, the example shows interaction between AP1 72 and STA1 74, STA2 76, STA3 78 and STA4 80.

AP1 gains the TXOP 414 inside the R-TWT-X SP 412 and sends an NFRP frame 912 with the new RTA Feedback Status Check subfield set to, for instance stage 1.

Upon receiving the NFRP frame from the R-TWT scheduling AP1, the following takes place. EHT STA1 and STA2 respond with feedback status 914 and 916, indicating high urgency levels of buffered RTA traffic using the RTA_FEED-BACK_STATUS bit(s) to the scheduling AP. EHT STA3 responds with feedback status 918 indicating a medium urgency level of buffered RTA traffic using the RTA_FEED-BACK_STATUS bit(s) to the scheduling AP. EHT STA4 responds with feedback status 920 indicating a low urgency level of the buffered RTA traffic using the RTA_FEED-BACK_STATUS bit(s) to the scheduling AP.

AP1 derives the list of AIDs from the STA1 through STA4 of which an NFDP response was sent, and their RTA_FEED-BACK_STATUS info. AP1 may send a Basic Trigger (BT) frame 922 to STA1 through STA4 with different RU sizes allocated to them. For example, AP1 allocates a large RU size to STA1 and STA2, a medium RU size to STA3, and a small RU size to STA4. It should also be noted that AP can schedule 'zero size' as well, with the scheduling being application dependent.

7. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) wherein during a restricted target wait time (R-TWT) service period (SP), a non-AP STA that obtains the reverse direction (RD) transmit opportunity (TXOP) is performing as a RD initiator, which can transmit a reverse direction grant (RDG) physical layer protocol data unit (PPDU) containing medium access control (MAC) physical data units (MPDUs) addressed to the associated AP which has been granted complete scheduling capability; (d)(ii) wherein a subfield, R-TWT AP Grant, in the high throughput (HT) control field for extra-high throughput (EHT) devices, is utilized to signal granting of complete scheduling capability to the AP whereby the AP performs as the RD responder during the R-TWT SP; and (d)(iii) wherein the RD initiator indicates R-TWT membership information in the current R-TWT SP to its peer node, which is not the AP.

A method of performing wireless communication in a network, comprising: (a) performing wireless communication between stations, which are either separate stations (STAs) or as STAs within multiple-link devices (MLDs), of a wireless communication network using communications protocol including performing carrier sense multiple access/collision avoidance (CSMA/CA) in which enhanced distributed channel access (EDCA) is utilized for random channel access on all links, and wherein each of the STAs operate as either a regular STA or an access point (AP) STA; (b) wherein during a restricted target wait time (R-TWT) service period (SP), a non-AP STA that obtains a reverse direction (RD) transmit opportunity (TXOP) performs as a RD initiator, which can transmit a reverse direction grant (RDG) physical layer protocol data unit (PPDU) containing medium access control (MAC) physical data units (MPDUs) addressed to the associated AP which has been granted complete scheduling capability; (c) wherein a subfield R-TWT AP Grant in the high throughput (HT) control field for extra-high throughput (EHT) devices is utilized to signal granting of complete scheduling capability to the AP when the AP performs as the RD responder during the R-TWT SP; and (d) wherein the RD initiator indicates R-TWT membership information in the current R-TWT SP to its peer node, which is not the AP.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor and memory configured for executing steps of a communications protocol, comprising: (b)(i) wherein during an R-TWT SP, a non-AP STA that grabs the RD TXOP is performing as a RD initiator, which may transmit a RDG PPDU containing MPDUs addressed to the associated AP w/grant a complete scheduling capability to AP; (b)(i)(A) wherein a new subfield in the HT control field (R-TWT AP Grant) for EHT devices indicates granting complete scheduling capability to the AP when the AP performs as the RD responder during R-TWT SP; (b)(ii) wherein the RD initiator can indicate R-TWT information, including membership status in the current R-TWT SP to its peer node, which is not the AP; (b)(ii)(A) wherein a new subfield (R-TWT Member) in the HTC field of the transmitted RDG PPDU is designed to carry R-TWT membership information; (b)(ii)(B) wherein upon receiving a response from the peer node which indicates it is not a member of current R-TWT SP, or after the timeout interval since the RD initiator finished transmitting the RDG PPDU to the peer node, the RD initiator may grant the R-TWT scheduling AP complete scheduling ability; (b)(ii)(C) wherein upon receiving a response from the peer node which indicates it is a member of current R-TWT SP, the RD initiator may continue communications (TX/RX) with the peer node as a RD responder; (b)(iii) wherein the RD initiator may transmit MU RDG PPDU(s) to both the R-TWT scheduling AP and the peer node in different channels (if available) with or without the same CH_BANDWIDTH; (b)(iii)(A) wherein the non-AP RD initiator may send QoS Null+HTC to the R-TWT scheduling AP if it doesn't have any Data addressed to the AP; and wherein in the RDG PPDU addressed to the R-TWT scheduling AP, the RD initiator informs the AP of the Address of the peer node; (b)(iii)(B) wherein if the RD initiator receives the R-TWT scheduling AP's RD response MPDU burst and is made aware that the reported peer node is not a member of current ongoing R-TWT SP, it should suspend transmission to that peer node; (b)(iii)(C) wherein if the RD initiator receives the response from the peer node, indicating it is a member of the current ongoing R-TWT SP and is performing as a RD responder, the RD initiator should continue receiving the RD response bursts from the peer node; wherein the next time when the RD initiator transmits an RDG PPDU to the same peer node in the same R-TWT SP, which is identified by the RTWT ID, it may not send RDG PPDU to the R-TWT scheduling AP.

The apparatus or method of any preceding implementation, wherein the AP as RD responder does not schedule transmissions that surpass the length of the RD TXOP and does not interrupt other R-TWT SPs, having different R-TWT identifications (IDs) as the current R-TWT SP.

The apparatus or method of any preceding implementation, wherein said membership information is conveyed in a subfield, R-TWT Member, in the HTC field of the transmitted RDG PPDU designed to carry the R-TWT membership information.

The apparatus or method of any preceding implementation, wherein upon receiving a response from the peer node which indicates it is not a member of the current R-TWT SP, or after the timeout interval since the RD initiator finished transmitting the RDG PPDU to the peer node, the RD initiator can grant the R-TWT scheduling AP complete scheduling capability.

The apparatus or method of any preceding implementation, wherein upon receiving a response from the peer node which indicates it is a member in the current R-TWT SP, the RD initiator continues performing transmissions and reception with the peer node as a RD responder.

The apparatus or method of any preceding implementation, wherein the RD initiator can transmit a multi-user (MU) RDG PPDU(s) to both the R-TWT scheduling AP and the peer node in different channels, even if they do not have the same channel bandwidth setting.

The apparatus or method of any preceding implementation, wherein the non-AP RD initiator can send a quality-of-service (QoS) Null with a high-throughput control field (HTC) to the R-TWT scheduling AP if it does not have any data addressed to the AP.

The apparatus or method of any preceding implementation, wherein in the RDG PPDU addressed to the R-TWT scheduling AP, the RD initiator informs the AP of an address for the peer node.

The apparatus or method of any preceding implementation, wherein if the RD initiator receives the RD response MPDU burst from the R-TWT scheduling AP, and is aware that the reported peer node is not a member of the current ongoing R-TWT SP, the RD initiator suspends transmissions to that peer node.

The apparatus or method of any preceding implementation, wherein if the RD initiator receives the response from the peer node, indicating it is a member of the current ongoing R-TWT SP and is performing as a RD responder, then the RD initiator continues receiving RD response bursts from the peer node.

The apparatus or method of any preceding implementation, wherein in a subsequent instance of the RD initiator transmitting an RDG PPDU to the same peer node in the same R-TWT SP, which is identified by the RTWT ID, then it does not send RDG PPDU to the R-TWT scheduling AP.

The apparatus or method of any preceding implementation, wherein the R-TWT scheduling AP that receives the RDG PPDU from the RD initiator as the RD responder AP, sends acknowledgement to the RD initiator that it has received the RDG PPDU and indicates if it accepts the granted complete scheduling capability during the RD TXOP.

The apparatus or method of any preceding implementation, wherein the RD responder AP does not trigger the RD initiator in the RD response burst during the RD TXOP.

The apparatus or method of any preceding implementation, wherein the RD responder AP with granted complete scheduling capability triggers at least one single-user (SU) or multi-user (MU) trigger-based (TB) PPDU from R-TWT scheduled STAs.

The apparatus or method of any preceding implementation, wherein the RD responder AP with granted complete scheduling capability transmits at least one single-user (SU) or multi-user (MU) PPDU to at least one non-AP STA that has membership in the current R-TWT SP.

The apparatus or method of any preceding implementation, wherein the RD responder AP does not schedule transmissions that surpass the duration of the RD TXOP and does not interrupt other R-TWT SP having different R-TWT IDs than the current R-TWT SP.

The apparatus or method of any preceding implementation, wherein the RD responder AP with granted complete scheduling capability sends a MPDU from the valid MPDU list, containing termination information for the RD initiator to terminate the granted complete scheduling capability in the granted RD TXOP.

The apparatus or method of any preceding implementation, wherein said valid MPDU list is determined from QoS Data, QoS Null, or a basic trigger (BT).

The apparatus or method of any preceding implementation, wherein the termination information is indicated in the R-TWT AP Grant subfield in the HT control field.

The apparatus or method of any preceding implementation, wherein the R-TWT scheduling AP that receives RDG PPDU from the RD initiator informing the AP of its peer nodes address, performs steps comprising: (a) if the R-TWT scheduling AP recognizes that the reported peer node is not a member of current RTWT SP, then the AP responds with a MPDU from the valid MPDU list to perform as RD responder; and (b) if the R-TWT scheduling AP recognizes that the reported peer node is a member of current R-TWT SP, then the AP does not respond to the RD initiator as a RD responder.

The apparatus or method of any preceding implementation, wherein said valid MPDU list comprises information from a basic trigger (BT) frame or quality-of-service (QoS) Null frame.

The apparatus or method of any preceding implementation, wherein the R-TWT scheduling AP may only trigger a null data packet (NDP) feedback report parameter (NFRP) response from R-TWT member STAs.

The apparatus or method of any preceding implementation, wherein a special NFRP trigger is configured to: (a) set a starting association identification (AID) field to a specific value, so that the Starting AID field cannot be recognized by pre-EHT STAs, but can be recognized by EHT STAs; and (b) indicating that the ongoing R-TWT SP is granted for R-TWT member STAs.

The apparatus or method of any preceding implementation, wherein the R-TWT scheduling AP may trigger all STAs with a request for new feedback status.

The apparatus or method of any preceding implementation, wherein new feedback status requests feedback comprising buffered access category/traffic identifier (AC/TID) traffic status, and/or buffered RTA life expiration time.

The apparatus or method of any preceding implementation, wherein the R-TWT scheduling AP assigns RUs to non-R-TWT member STAs according to the new feedback status.

The apparatus or method of any preceding implementation, wherein the R-TWT scheduling AP that receives the RDG PPDU from the RD initiator is denoted as the RD responder AP; and has the following conditions: (a) the RD responder AP should acknowledge the RD initiator that it receives the RDG PPDU and should indicate if it accepts the granted complete scheduling capability during the RD TXOP; (a)(i) wherein in this case, the RD responder AP may not trigger the RD initiator in the RD response burst during the RD TXOP; (a)(ii) wherein the RD responder AP with granted complete scheduling capability can trigger SU/MU TB PPDU(s) from RTWT scheduled STAs; (a)(iii) wherein the RD responder AP with granted complete scheduling capability can transmit SU/MU PPDU(s) to non-AP STA(s) that own membership of the current ongoing R-TWT SP; (a)(iv) wherein the RD responder AP should not schedule transmissions that surpass the RD TXOP and should not interrupt the other R-TWT SP w/different R-TWT ID as current R-TWT SP; (a)(v) wherein the RD responder AP with granted complete scheduling capability can send a MPDU from the valid MPDU list, (e.g., QoS Data, QoS Null, BT etc.,) to the RD initiator to terminate the granted complete scheduling capability in the granted RD TXOP; wherein in at least one embodiment, the termination information can be indicated in the new (R-TWT AP Grant) subfield in HT control field.

The apparatus or method of any preceding implementation, wherein the R-TWT scheduling AP that receives RDG PPDU from the RD initiator and informs the AP of its peer node address performs the following: (a) wherein if the R-TWT scheduling AP recognizes that the reported peer node is not a member of current RTWT SP, the AP can respond with a MPDU from the valid MPDU list (e.g., Basic Trigger or QoS Null) to perform as RD responder; (b) wherein if the R-TWT scheduling AP recognizes that the reported peer node is a member of the current R-TWT SP, the AP shall not respond to the RD initiator as a RD responder.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

| AC Constraint Subfield Values | |
| --- | --- |
| Value | Description |
| 0 | Response to a reverse direction grant (RDG) contains Data frames from any TID [See 10.29.4 (Rules for RD Responder)] |
| 1 | Response to an RDG contains Data frames ONLY from the same AC as the last Data frame received from the RD initiator [See 10.29.4 (Rules for RD Responder)] |

TABLE 2

| RDG/More PPDU Subfield Values | | |
| --- | --- | --- |
| Value | Role of Tx STA | Interpretation of Value |
| 0 | Not RD responder RD responder | No reverse grant PPDU carrying frame is last Tx by RD responder |
| 1 | RD initiator RD responder | RDG is present PPDU carrying frame is followed by another PPDU |

TABLE 3

| HT Control Field Format | | | | | |
| --- | --- | --- | --- | --- | --- |
| Value | B0 | B1 | B2-B29 | B30 | B31 |
| HT | 0 | | HT Control Middle | AC Const. | RDG/More PPDU |
| VHT | 1 | 0 | VHT Control Middle | AC Const. | RDG/More PPDU |
| HE | 1 | 1 | | A-Control | |

TABLE 4

| R-TWT Member Subfield values | | |
| --- | --- | --- |
| R-TWT Mem | Tx by RD Init. | Tx by RD Resp. |
| 1 | RD initiator is a member of current R-TWT SP | RD responder is a member of current R-TWT SP |
| 0 | RD initiator is NOT a member of current R-TWT SP | RD responder is a member of current R-TWT SP |
| none | Outside of any R-TWT SP | Outside of any R-TWT SP |

TABLE 5

| Address Field Contents | | | | | | | |
| --- | --- | --- | --- | --- | --- | --- | --- |
| | | | | Addr. 3 | | Addr. 4 | |
| To DS | From DS | Add. 1 | Addr. 2 | MSDU & Short A-MSDU case | Basic A-MSDU & Dynamic A-MSDU | MSDU & Short A-MSDU case | Basic A-MSDU & Dynamic A-MSDU |
| 0 | 0 | RA = DA | TA = DA | BSSID | BSSID | N/A | N/A |
| 0 | 1 | RA | TA = BSSID | SA | BSSID | N/A | N/A |
| 1 | 0 | RA = BSSID | TA | DA | BSSID | N/A | N/A |
| 1 | 1 | RA | TA | DA | BSSID | SA | BSSID |

TABLE 6

| To/From DS Combinations in Data Frames | |
| --- | --- |
| To/From DS | Meaning |
| To DS = 0 From DS = 0 | A Data frame from one STA to another STA within the same IBSS or the same PBSS. A Data frame direct from one non-AP STA to another non-AP STA within the same infrastructure BSS, or a Data frame outside the context of a BSS. This is the only valid combination for Data frames transmitted by an IBSS or PBSS STA. or outside the context of a BSS. |
| To DS = 1 From DS = 0 | A Data frame destined for the DS or being sent by a STA associated with an AP to the Port Access Entity in that AP |
| To DS = 0 From DS = 1 | A Data frame exiting the DS or being sent by the Port Access Entity in an AP, or a group addressed mesh Data frame with the Mesh Control field present using the three-address MAC header format. This is the only valid combination for Data frames transmitted by a non-GLK AP and group addressed Data frames transmitted by a mesh STA. |
| To DS = 1 From DS = 1 | A Data frame using the four-address MAC header format. This standard defines procedures for using this combination of field values in mesh BSSs by S1G relays, as specified in 10.54 (S1G relay operation), or by a GLK STA. This is the only valid combination for individually addressed Data frames transmitted by a mesh STA. |

TABLE 7

| Feedback Type subfield Encoding | |
| --- | --- |
| Value | Description |
| 0 | Resource request |
| 1-15 | Reserved |

TABLE 8

| Feedback Status Description | |
| --- | --- |
| Feedback_Status | Condition |
| 0 | The STA is in the awake state and reports buffered octets for transmission not exceeding the resource request buffer threshold. NOTE-The STA can use this value to indicate that it is in the awake state even if it does not have any buffered octets for transmission, for example to solicit delivery of BUs known to be buffered at the AP |
| 1 | The STA is in the awake state and reports buffered octets for transmission exceeding the resource request buffer threshold. |

What is claimed is:

1. An apparatus for wireless communication in a network, the apparatus comprising:

(a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol for said wireless communication circuit, comprising:

(i) wherein during a restricted target wait time (R-TWT) service period (SP), a non-AP STA that obtains a reverse direction (RD) transmit opportunity (TXOP) is performing as a RD initiator, which can transmit a reverse direction grant (RDG) physical layer protocol data unit (PPDU) containing medium access control (MAC) physical data units (MPDUs) addressed to an associated AP which has been granted complete scheduling capability;

(ii) wherein a subfield, R-TWT AP Grant, in a high throughput (HT) control field for extra-high throughput (EHT) devices, is utilized to signal granting of complete scheduling capability to the AP whereby the AP performs as the RD responder during the R-TWT SP; and (iii) wherein the RD initiator indicates R-TWT membership information in the current R-TWT SP to its peer node, which is not the AP.

2. The apparatus of claim 1, wherein the AP as RD responder does not schedule transmissions that surpass the length of the RD TXOP and does not interrupt other R-TWT SPs, having different R-TWT identifications (IDs) as the current R-TWT SP.

3. The apparatus of claim 1, wherein said membership information is conveyed in a subfield, R-TWT Member, in the HTC field of the transmitted RDG PPDU designed to carry the R-TWT membership information.

4. The apparatus of claim 1, wherein upon receiving a response from the peer node which indicates it is not a member of the current R-TWT SP, or after a timeout interval since the RD initiator finished transmitting the RDG PPDU to the peer node, the RD initiator can grant the R-TWT scheduling AP complete scheduling capability.

5. The apparatus of claim 1, wherein upon receiving a response from the peer node which indicates it is a member in the current R-TWT SP, the RD initiator continues performing transmissions and reception with the peer node as a RD responder.

6. The apparatus of claim 1, wherein the RD initiator can transmit a multi-user (MU) RDG PPDU(s) to both the R-TWT scheduling AP and the peer node in different channels, even if they do not have the same channel bandwidth setting.

7. The apparatus of claim 6, wherein the non-AP RD initiator can send a quality-of-service (QOS) Null with a high-throughput control field (HTC) to the R-TWT scheduling AP if it does not have any data addressed to the AP.

8. The apparatus of claim 7, wherein in the RDG PPDU addressed to the R-TWT scheduling AP, the RD initiator informs the AP of an address for the peer node.

9. The apparatus of claim 1, wherein if the RD initiator receives a RD response MPDU burst from the R-TWT scheduling AP, and is aware that the reported peer node is not a member of the current ongoing R-TWT SP, the RD initiator suspends transmissions to that peer node.

10. The apparatus of claim 1, wherein if the RD initiator receives the response from the peer node, indicating it is a member of the current ongoing R-TWT SP and is performing as a RD responder, then the RD initiator continues receiving RD response bursts from the peer node.

11. The apparatus of claim 10, wherein in a subsequent instance of the RD initiator transmitting an RDG PPDU to the same peer node in the same R-TWT SP, which is identified by, an RTWT ID, then it does not send RDG PPDU to the R-TWT scheduling AP.

12. The apparatus of claim 1, wherein the R-TWT scheduling AP that receives the RDG PPDU from the RD initiator as the RD responder AP, sends acknowledgement to the RD initiator that it has received the RDG PPDU and indicates if it accepts the granted complete scheduling capability during the RD TXOP.

13. The apparatus of claim 12, wherein the RD responder AP does not trigger the RD initiator in a RD response burst during the RD TXOP.

14. The apparatus of claim 12, wherein the RD responder AP with granted complete scheduling capability triggers at least one single-user (SU) or multi-user (MU) trigger-based (TB) PPDU from R-TWT scheduled STAs.

15. The apparatus of claim 12, wherein the RD responder AP with granted complete scheduling capability transmits at least one single-user (SU) or multi-user (MU) PPDU to at least one non-AP STA that has membership in the current R-TWT SP.

16. The apparatus of claim 12, wherein the RD responder AP does not schedule transmissions that surpass the duration of the RD TXOP and does not interrupt other R-TWT SP having different R-TWT IDs than the current R-TWT SP.

17. The apparatus of claim 12, wherein the RD responder AP with granted complete scheduling capability sends a MPDU from a valid MPDU list, containing termination information for the RD initiator to terminate the granted complete scheduling capability in the granted RD TXOP.

18. The apparatus of claim 17, wherein said valid MPDU list is determined from QoS Data, QoS Null, or a basic trigger (BT).

19. The apparatus of claim 17, wherein the termination information is indicated in the R-TWT AP Grant subfield in the HT control field.

20. The apparatus of claim 1, wherein the R-TWT scheduling AP that receives RDG PPDU from the RD initiator informing the AP of its peer nodes address, performs steps comprising: (a) if the R-TWT scheduling AP recognizes that the reported peer node is not a member of current RTWT SP, then the AP responds with a MPDU from a valid MPDU list to perform as RD responder; and (b) if the R-TWT scheduling AP recognizes that the reported peer node is a member of current R-TWT SP, then the AP does not respond to the RD initiator as a RD responder.

21. The apparatus of claim 20, wherein said valid MPDU list comprises information from a basic trigger (BT) frame or quality-of-service (QOS) Null frame.

22. The apparatus of claim 1, wherein the R-TWT scheduling AP may only trigger a null data packet (NDP) feedback report parameter (NFRP) response from R-TWT member STAs.

23. The apparatus of claim 22, wherein a special NFRP trigger is configured to: (a) set a starting association identification (AID) field to a specific value, so that the Starting AID field cannot be recognized by pre-EHT STAs, but can be recognized by EHT STAs; and (b) indicating that the ongoing R-TWT SP is granted for R-TWT member STAs.

24. The apparatus of claim 1, wherein the R-TWT scheduling AP may trigger all STAs with a request for new feedback status.

25. The apparatus of claim 24, wherein new feedback status requests feedback comprising buffered access category/traffic identifier (AC/TID) traffic status, and/or buffered RTA life expiration time.

26. The apparatus of claim 25, wherein the R-TWT scheduling AP assigns RUs to non-R-TWT member STAs according to the new feedback status.

27. A method of performing wireless communication in a network, comprising:

(a) performing wireless communication between stations, which are either separate stations (STAs) or as STAs within multiple-link devices (MLDs), of a wireless communication network using communications protocol including performing carrier sense multiple access/collision avoidance (CSMA/CA) in which enhanced distributed channel access (EDCA) is utilized for random channel access on all links, and wherein each of the STAs operate as either a regular STA or an access point (AP) STA;

(b) wherein during a restricted target wait time (R-TWT) service period (SP), a non-AP STA that obtains a reverse direction (RD) transmit opportunity (TXOP) performs as a RD initiator, which can transmit a reverse direction grant (RDG) physical layer protocol data unit (PPDU) containing medium access control (MAC) physical data units (MPDUs) addressed to an associated AP which has been granted complete scheduling capability;

(c) wherein a subfield R-TWT AP Grant in a high throughput (HT) control field for extra-high throughput (EHT) devices is utilized to signal granting of complete scheduling capability to the AP when the AP performs as the RD responder during the R-TWT SP; and (d) wherein the RD initiator indicates R-TWT membership information in the current R-TWT SP to its peer node, which is not the AP.

* * * * *